United States Patent
Seguchi et al.

(12)

(10) Patent No.: US 6,590,312 B1
(45) Date of Patent: Jul. 8, 2003

(54) ROTARY ELECTRIC MACHINE HAVING A PERMANENT MAGNET STATOR AND PERMANENT MAGNET ROTOR

(75) Inventors: Masahiro Seguchi, Obu (JP); Keiichiro Banzai, Toyota (JP); Sumio Yanase, Okazaki (JP); Shinji Kouda, Kariya (JP); Shigenori Yoneda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/714,875

(22) Filed: Nov. 17, 2000

(30) Foreign Application Priority Data

| Nov. 18, 1999 | (JP) | 11-328233 |
| Mar. 15, 2000 | (JP) | 2000-072973 |
| Mar. 15, 2000 | (JP) | 2000-072982 |
| Mar. 29, 2000 | (JP) | 2000-091850 |
| Mar. 29, 2000 | (JP) | 2000-091859 |

(51) Int. Cl.$^7$ .............. H02K 21/12; H02K 16/00; H02K 16/02; H02K 1/22
(52) U.S. Cl. ............ 310/266; 310/114; 310/156.01; 310/156.53; 310/156.57; 310/156.49; 310/156.12; 310/156.37
(58) Field of Search .......... 310/154.08, 154.11, 310/154.16, 154.25, 154.28, 154.32, 154.42, 154.46, 154.47, 156.11, 156.15, 156.33, 156.35, 156.36, 156.37, 156.47, 156.48, 156.53, 156.54, 156.55, 156.56, 266, 114, 181, 46

(56) References Cited

U.S. PATENT DOCUMENTS

| 3,230,406 A | * | 1/1966 | Henry-Baudot ............. 310/155 |
| 4,958,095 A | * | 9/1990 | Uchida et al. ............. 123/41.31 |
| 5,554,903 A | * | 9/1996 | Takara ................... 310/156.01 |
| 5,723,933 A | * | 3/1998 | Grundl et al. ............. 310/208 |
| 5,744,895 A | * | 4/1998 | Seguchi et al. ............. 310/112 |
| 5,783,894 A | * | 7/1998 | Wither .................. 310/156.26 |
| 5,955,807 A | * | 9/1999 | Kajiura et al. ......... 310/156.66 |
| 6,002,192 A | * | 12/1999 | Krivospitski et al. ....... 310/254 |
| 6,114,784 A |   | 9/2000 | Nakano ...................... 310/59 |
| 6,133,659 A | * | 10/2000 | Rao .............................. 123/3 |
| 6,285,104 B1 | * | 9/2001 | Nashiki ..................... 310/184 |
| 6,311,495 B1 | * | 11/2001 | Shimizu et al. ........ 123/DIG. 8 |

FOREIGN PATENT DOCUMENTS

| DE | 197 04 652 | 7/1998 |
| EP | 0 901 923 | 3/1999 |

(List continued on next page.)

OTHER PUBLICATIONS

Profomo F. et al., "Axial Flux Machines Drives: a New Viable Solution for Electric Cars" Industrial Electronics, Control, and Instrumentation, 1996., Processings of the 1996 IEEE IECON 22$^{nd}$ International Conference on Taipei, Taiwan Aug. 5–10, 1996, New York, NY, Aug. 5, 1996, pp. 34–40.

*Primary Examiner*—Nestor Ramirez
*Assistant Examiner*—Julio Cesas Gonzalez
(74) *Attorney, Agent, or Firm*—Oliff & Berridge, PLC

(57) ABSTRACT

A rotary electric machine for a hybrid vehicle includes a rotor connected between a vehicle engine and a torque transmission mechanism at the back of the vehicle engine and a stator. The rotor includes an outer rotor portion having an inner surface electro-magnetically connected to the outer surface of the stator, an inner rotor portion having an outer surface electro-magnetically connected to the inner surface of the stator. The stator includes a stator core disposed between the inner rotor portion and the outer rotor portion and a multi-phase winding wound on the stator to be electro-magnetically connected with both the outer and inner rotor portions.

19 Claims, 29 Drawing Sheets

FOREIGN PATENT DOCUMENTS

| | | | |
|---|---|---|---|
| JP | 47-12743 | | 4/1972 |
| JP | 48-41924 | | 12/1973 |
| JP | 51-144711 | | 11/1976 |
| JP | 55-157964 | | 12/1980 |
| JP | 61-35145 | | 2/1986 |
| JP | 63-156924 U | | 6/1990 |
| JP | 402311160 A | * | 12/1990 |
| JP | 2-19965 U | | 11/1991 |
| JP | 403284148 A | * | 12/1991 |
| JP | A-61-10927 | | 4/1994 |
| JP | A-8-242564 | | 9/1996 |
| JP | A-10-84656 | | 3/1998 |
| JP | 10-201145 | | 7/1998 |
| JP | 10-271782 | | 10/1998 |
| JP | 11-46461 | | 2/1999 |
| JP | 411046461 A | * | 2/1999 |
| JP | A-11-191951 | | 7/1999 |
| WO | WO 98/35423 | | 8/1998 |
| WO | WO98/50998 | | 11/1998 |
| WO | WO 99/39426 | | 8/1999 |

* cited by examiner

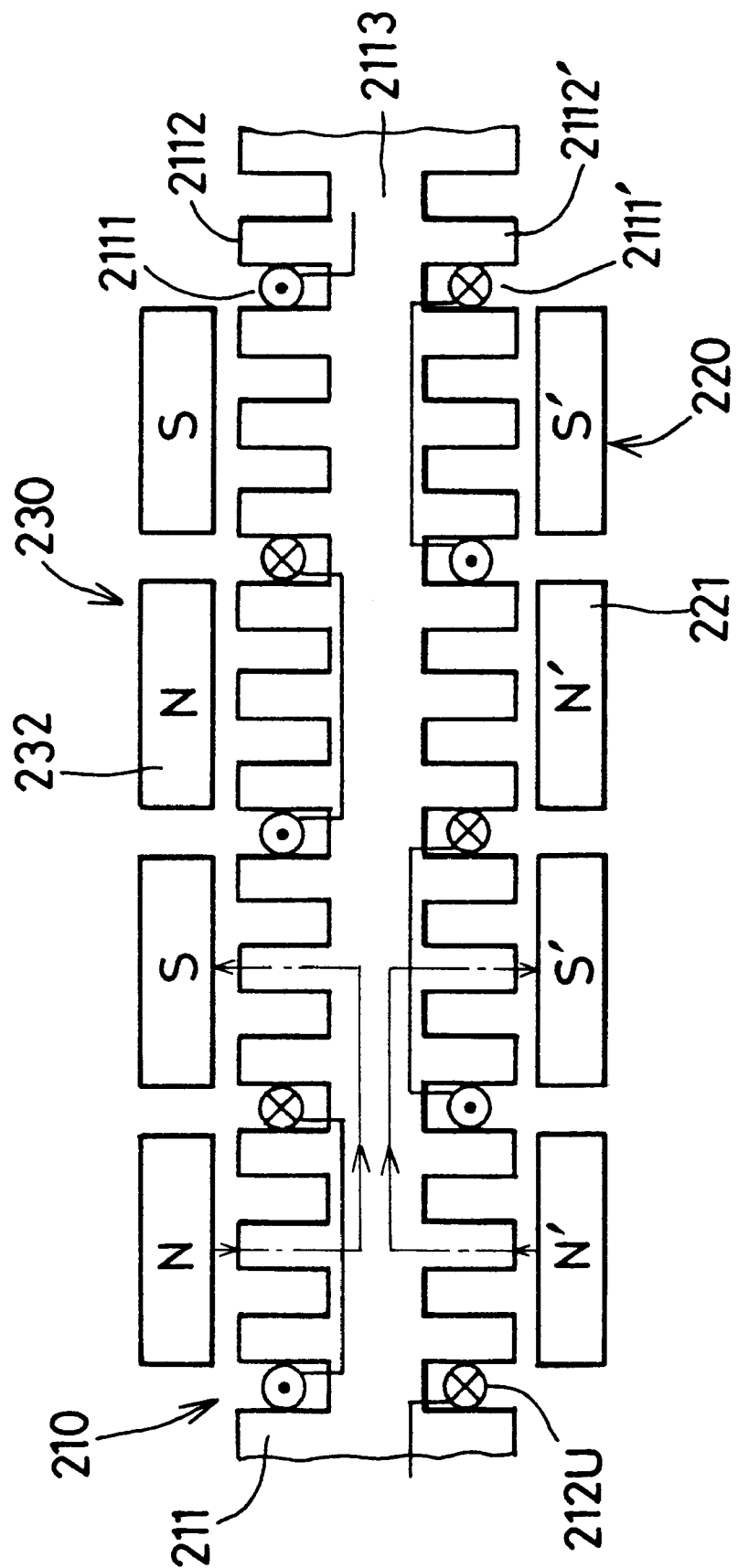

ROTARY ELECTRIC MACHINE HAVING A PERMANENT MAGNET STATOR AND PERMANENT MAGNET ROTOR

CROSS REFERENCE TO RELATED APPLICATION

The present application is based on and claims priority from Japanese Patent Applications: Hei 11-328233, filed Nov. 18, 1999; 2000-72973, filed Mar. 25, 2000; 2000-72982, filed Mar. 15, 2000; 2000-91850, filed Mar. 29, 2000; and 2000-91859, filed Mar. 29, 2000; the contents of which are incorporated herein by reference.

BACKGROUND OF THE INVENTION

1. Field of the Invention

The present invention relates to a vehicle rotary electric machine for an electric vehicle, and, more particularly, a rotary electric machine that starts an engine, assists the engine to drive wheels and regenerates electric power from running energy of a vehicle.

2. Description of the Related Art

JP-A-11-78558 proposes a vehicle rotary electric machine (hereinafter referred to as the vehicle-rear rotary electric machine) including a rotor connected between an engine and a gear transmission to be driven by a crank shaft.

The conventional vehicle-rear rotary electric machine makes it possible to mount various belt-driven accessories in front of the engine along a belt, which prevents a pulley of a small diameter from slipping thereon.

However, such a vehicle-rear rotary electric machine has a long power train between a crankshaft and a torque transmission mechanism. The power train includes a clutch disposed at the back of the crankshaft and a torque converter. Therefore, the power train with its housing needs a large mounting space, which may increase a body vibration.

SUMMARY OF THE INVENTION

Therefore, it is an object of the present invention to solve the above-described problems and to provide a compact, light-weight, and high power vehicle-rear-type rotary electric machine.

Such a vehicle-rear-type rotary electric machine (hereinafter referred to as the rear-type machine or the machine) is connected coaxially with a crankshaft. The rear-type machine has a cylindrical stator, a rotor having, an inner rotor portion and an outer rotor portion respectively disposed at opposite peripheral sides of the stator, and a stator winding having a set of multi-phase windings for electro-magnetically connecting with both the rotor portions.

Further, the axial length of the machine can be decreased to about a half thereof. The axial length of the space between the back of the engine and the torque transmission mechanism is reduced to make the power train compact. This naturally restrains vibration of the power train.

If the above inner and outer rotor portions overlap each other in the radial direction, the radial length of the machine increases. However, this increases the flywheel effect of the machine, so that any additional rotary-inertia-member for the flywheel effect can be omitted. In other words, the rotor of the machine according to the invention has a part of or all of the flywheel effect.

The inertia mass of the flywheel is proportional to a square of the mean value of the radius of the flywheel.

Therefore, the flywheel effect per weight of the rotor of the machine that has two-radially-combined-rotor-type structure can be drastically improved as compared with the machine that has the single-rotor-type structure.

Moreover, because the opposite peripheral surfaces of a single stator are used for magnetic connection, the core back can be used as a common yoke for the magnetic path of the two rotor portions. This can make the stator more compact and lighter.

Because two rotating magnetic fields generated by the two rotor portions interlink the stator winding, it is possible to shorten the coil ends of the stator winding as compared with a rotary electric machine having respective stators for respective rotor portions.

Moreover, because magnetic fluxes generated by different rotor portions, it is possible to provide a machine that has a combined characteristic of two rotary electric machines.

According to another feature of the invention, the machine further includes a bowl member that connects the torque transmission mechanism and a crank shaft. Therefore, it is not necessary to provide an additional frame for supporting two rotor portions.

According to another feature of the invention, a annular portion supports a larger cylindrical member that supports the outer rotor portion and connects a connecting disk with the transmission mechanism. Therefore, the shape can be simplified, the size and weight can be reduced, and an excellent linkage with the torque transmission mechanism can be provided.

According to another feature of the invention, the stator core has a core back at the radial center thereof. Therefore, the stator core can be made compact and light.

According to a further feature of the invention, each set of the phase windings is wound on one of opposite surfaces of the stator to form a U-shaped cross-section in the circumferential and axial directions. Therefore, the structure and manufacture of the stator can be simplified. In particular, each phase winding is manufactured in the U-shape beforehand so that each can be readily inserted into the inner and outer slot.

According to another feature of the invention, each of the phase windings is wound to form a square cross-section. Therefore, the structure and the manufacture of the stator can be made simple.

Further, each of the phase windings is wound in a toroidal shape (square in cross-section), invalid length per one-turn coil can be made equal to the length a wire passing along opposite ends of the stator core. Therefore, the wire length of the winding can be drastically reduced, the weight of the copper wire can be reduced, and the efficiency thereof can be increased.

According to another feature of the invention, each of the phase windings is wave-wound at approximately the same slot pitches as the magnetic pole pitches so that current flowing at the slot formed at the inner surface and current flowing the slots formed at the outer surface are opposite to each other. Therefore, the stator can be made simple in structure, and the winding can be carried out by a winding machine.

According to another feature of the invention, each of the rotor portions has a rotor-structure having permanent magnets.

According to another feature of the invention, both the rotor portions have a squirrel-cage structure. Therefore, a highly strong and durable rotor can be manufactured at low cost. Moreover, it is possible to control the output voltage from the stator while the engine is operating. Even if the control can not be made, the output voltage does not become too high without providing control means (which needs high voltage insulation).

According to a further feature of the invention, each of the rotor portions has a reluctance-type-rotor-structure. Therefore, the rotor can be manufactured at a low cost.

According to a further feature of the invention, the inner rotor portion has a permanent-magnet-rotor-structure, and the outer rotor portion has a reluctance-type-rotor-structure. Therefore, the output power of the inner rotor portion, which has a small electromagnetic connection area and a small circumferential speed, can be increased, and the drawback of the low-power reluctance rotor can be compensated by a large diameter of the outer rotor.

According to another feature of the invention, the circumferentially central portion of a magnetic salient pole of the reluctance-type-rotor-structure is disposed at a position an electric angle 45°–90° in advance of the circumferentially central portion of a magnetic pole of the permanent-magnet-type-rotor-structure in the rotation direction.

Therefore, the resultant torque and output power can be increased.

According to another feature of the invention, the stator is fixed to the housing by a supporting rod member that is force-fitted to the core back in the axial direction. Therefore, the supporting rod member achieves both to compress the stator core made of laminated iron sheets in the lamination direction and to fix the stator to the housing, without decreasing the area of both surfaces of the electromagnetic connection of the stator core.

According to another feature of the invention, one end of both the rotor portions has a permanent-magnet type-rotor-structure, and the other end of both the rotor portions has a field-coil-type rotor-structure. Therefore, the generation and motor characteristics of the machine can be controlled by the field current control.

According to another feature of the invention, one of the rotor portions is a permanent magnet rotor, and the other is an induction type rotor portion having magnetic poles. A field coil is wound on a stationary yoke to alternately magnetize the magnetic poles of the induction type rotor. Therefore, it is not necessary to mount the field coil in the rotor portion. This increases resistance to the centrifugal force and simplifies the field current circuit.

According to another feature of the invention, the machine further includes a control unit for controlling the current of the stator winding by inverting field current. Therefore, at a high speed rotation, even if one of the rotor portions generates a high voltage, the other rotor portion having the field coil type rotor structure generates an inverse voltage so as to prevent unnecessary output voltage of the stator winding.

According to further feature of the invention, the slots formed at the outer surface and at the inner surface are disposed at the same circumferential positions at opposite sides of the core back. In addition, the magnetic poles of the inner rotor portion and the outer rotor portion that are disposed at the circumferentially the same position are polarized in the opposite direction.

Therefore, most of the magnetic fluxes pass a large magnetic path going to and coming from one of the rotor portions, so that the magnetic fluxes passing the core back can be reduced, thereby, to control the iron loss and magnetic saturation.

According to another feature of the invention, the slots formed at the outer surface and the inner surface are disposed at opposite side of the core back and shifted from each other at half slot pitch in the circumferential direction. Therefore, average radial width of the core back increases to prevent the iron loss and magnetic saturation as well as to make the stator core thinner and more compact.

It is another object of the present invention to provide a low-noise and low vibration vehicle rotary electric machine.

According to a further feature of the invention, a vehicle rotary electric machine includes a rotor for transmitting torque to a vehicle shaft and a stator having a peripheral surface opposite circumference of the rotor and fixed to a housing. The rotor includes an outer rotor portion having an inner surface electro-magnetically connected to the outer surface of the stator, an inner rotor portion fixed to the outer rotor portion and having an outer surface electro-magnetically connected to the inner surface of the stator. The stator includes a stator core disposed between the inner rotor portion and the outer rotor portion and a stator winding having a set of multi-phase windings wound on the stator core for electro-magnetically connecting with both the rotor portions. The stator core has a plurality of outer slots-and-teeth formed in the outer peripheral surface thereof at certain pitches and a plurality of inner slots-and-teeth formed in the inner peripheral surface thereof at certain pitches. Each of the inner peripheral surface on the outer rotor portion and the outer peripheral surface of the inner rotor portion has a salient pole portion having a small magnetic reluctance. When the circumferential center of the salient pole portion of the outer rotor portion and the circumferential center of the outer slot opening of the stator core are disposed at the same angular position, the circumferential center of the salient pole portion of the inner rotor portion and the circumferential center of the inner slot opening of the stator core are shifted from each other at an interval that is equal to or less than ¼ of a slot-pitch.

Regarding the magnetic pole portion of the outer rotor portion and the outer slots of the stator, the circumferential component of the magnetic force generated between the above two causes a reluctance torque. This radial component of the magnetic force gives the teeth a tensile force acting toward the magnetic pole portion. The radial component of the magnetic force, because of the slot openings of the outer slots of the stator, changes at a cycle equal to the time of one pole-pitch rotation. This causes vibration and noises. In the same manner, a cyclic change of the radial component of the magnetic force between the inner rotor portion and inner slots causes vibration and noises.

It has been noted that the radial components of two electro-magnetic forces acting on the outer periphery inside the stator are opposite to each other. The phase angle between two is controlled to balance the radial components of the two magnetic forces to reduce the above-stated vibration and noises.

When the radial component of a maximum electro-magnetic force is given to the outer teeth of the stator from the magnetic pole portion of the outer rotor portion, the radial component of a maximum electro-magnetic force is given to the inner teeth of the stator from the magnetic pole portion of the inner rotor portion. At this time, the stator is pulled radially outward at a maximum force by the magnetic pole portion of the outer rotor portion. At the same time, it is also pulled radially inward by the magnetic pole portion of the inner rotor portion, so that the radial shift of the stator can be balanced.

When the circumferential center of the magnetic salient pole of the outer rotor portion and the circumferential center of the outer slot opening of the stator core are positioned at the same angular position, the circumferential center of the magnetic salient pole of the inner rotor portion and the circumferential center of the inner slot opening of the stator core are positioned at the same angular position.

It is clear that the combined force of the ripple of the radial component of the two electro-magnetic forces that act on the inner and outer peripheries of the stator decreases even if the phase of the above two is different from each other. If the cycle corresponds to one-slot pitch is $2\pi$, it is clear that the phase difference between two is a value between $-2\pi(-¼$ slot-pitch) and $+2\pi(+¼$ slot-pitch).

According to another feature of the invention, the circumferential center of the magnetic salient pole of the outer rotor portion and the circumferential center of the magnetic salient pole of the inner rotor portion are positioned at the same angular position within a normal production tolerance. The circumferential center of the outer slot opening of the stator core and the circumferential center of the inner slot opening of the stator core are positioned at the same angular position within a normal production tolerance. The outer slots and the inner slots that are positioned at the same angular position respectively accommodate conductors of the same phase but of opposite direction.

Thus, the angular position of both rotor portions of the magnetic salient poles is the same. As a result, the angular position of the teeth of the inner and outer peripheries of the stator is the same. Therefore, the radial component of the above electro-magnetic force acting on the outer teeth and the radial component of the above electro-magnetic force inversely acting on the inner teeth appears at the same angular position in the direction opposite to each other and in the same magnitude.

According to another feature of the invention the outer slots and the inner slots that are positioned at the same angular position accommodate a concentration-wound stator winding.

Therefore, it is easy to wind the coils, and the coil ends become smaller so that a small and high powered rotary electric machine can be provided.

According to another feature of the invention, concentrate-wound coils are wound around respective pairs of outer and inner slots of cylindrical stator core disposed at the same angular position, and a pair of rotor portions is disposed to respectively face both the peripheral surfaces.

Therefore, concentrate coils can be easily mounted in each pair of inner and outer slots disposed at the same angular position without dividing the stator core into pieces, so that the length of coil ends thereof extending in the radial direction can be reduced to the minimum. In addition, a pair of axially extending portion of each concentrate-wound coil electro-magnetically connects both the outer and the inner rotor portions to generate torque. As a result, axial length of the stator can be drastically reduced by reduction in the axial length of the coil end and by utilizing both peripheral surfaces of the stator core.

It is another object of the invention is to provide a radial-air-gap-type vehicle rotary electric machine having one-end-support structure that is excellent in cooling the rotor, stator and the rotor frame.

According to another feature of the invention, a stator core is fixed to the housing at the side opposite a rotor frame, and a rotor frame has a gap between the stator and the rotor frame and an air inlet for conducting air from outside to the gap. In other words, the rotor frame has an air inlet for conducting air from outside to a radially extending gap between the stator and the rotor frame.

It is a further object of the invention is to provide a one-end-supported radial-air-gap-type rotary electric machine that is easy to fix and position.

In the rotary electric machine according to another feature of the invention, a stator core is supported to a housing at its one end by a plurality of support pins that are respectively force-fitted to axial holes formed in the stator core and inserted and fixed to a plurality of through holes formed at radial wall of the housing. In other words, a plurality of support pins are force-fitted into the core-back of stator core in the axial direction, and one end of each the support pin is inserted to a through hole of a radial wall of the housing to support the stator core by the housing at one end thereof.

Thus, fixing and positioning works of the stator core can be made much easier than those by through bolts inserted into through holes of the stator core. Therefore, accurate centering of the stator core can be carried out only by the support pins being inserted into the through hole of the radial wall.

Preferably, provisional holes, which are slightly smaller than the through holes of the stator core, are formed when core sheets are punched out. The provisional through holes are formed into the through holes when the core sheets are laminated.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 24 is a diagram illustrating a portion (U-phase) of the stator winding shown in FIG. 21;

DETAILED DESCRIPTION OF THE PREFERRED EMBODIMENTS

Figure 1:
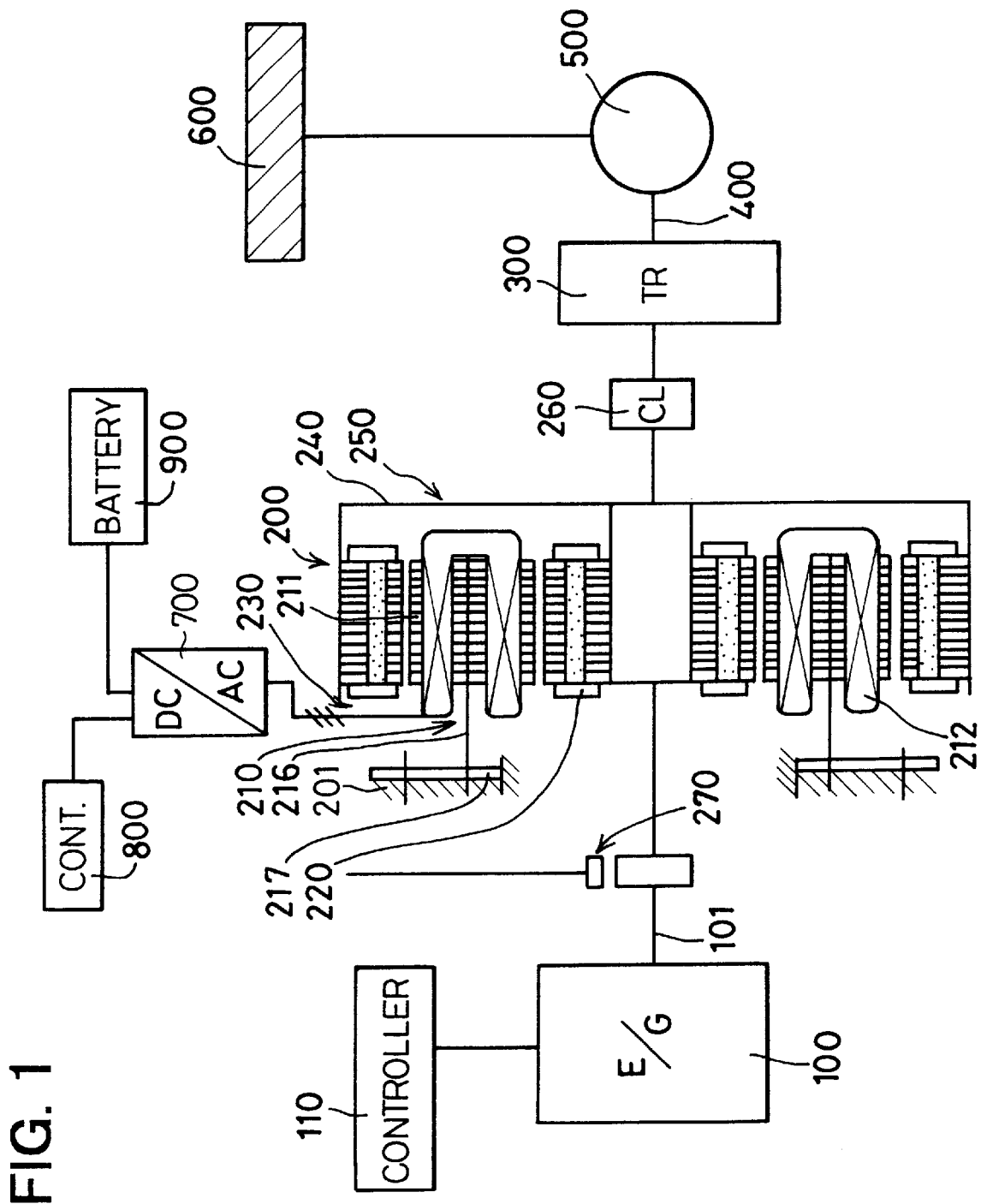
FIG. 1 is a block diagram of a vehicle drive unit that includes a vehicle rotary electric machine according to a first embodiment of the invention.

A vehicle rotary electric machine according to a first embodiment of the invention is described with reference to FIGS. 1–3.

A vehicle drive unit includes engine 100 having crankshaft 101, an engine controller 110, and rotary electric machine 200.

Machine 200 has stator 210, which has stator core 211. Stator 210 has a three-phase stator winding 212 thereon. Stator core 211 has core back 215 fixed to housing 102 by stator supporting frame 217 and bolt 216, which is force-fitted to core back 215. Inner and outer surfaces of stator core 211 respectively have outer and inner slots 213, 213' and outer and inner teeth 214, 214'. Inner rotor portion 220 and outer rotor portion 230 are respectively opposed, via an air gap, to the inner and outer peripheries of stator core 211. Both rotor portions 220 and 230 are fixed to bowl-shaped member 240, which is fixed to crankshaft 101, thereby forming rotor 250.

Bowl member 240 has annular portion 243, and clutch 260 is fixed to the rear-end of annular portion 243. Clutch 260 is connected to wheels 600 via transmission mechanism 300, propeller shaft 400, and differential gear unit 500.

Converter 700 converts AC power to DC power or DC power to AC power between stator winding 212 and battery 900. Controller 800 controls converter 700.

Inner rotor portion 220 includes magnetic core 221 and permanent magnets 222. Magnetic core 221 is composed of laminated sheets fitted and fixed to small cylinder portion 241 of bowl member 240 to oppose the inner periphery of stator core 211 via an air gap. Permanent magnets 222 are inserted into axially extending magnet holes 233 formed at magnetic core 221. Inner rotor portion 220 has an IPM (Interior Permanent Magnet) structure.

Magnet pole member 230 includes magnetic core 231 and permanent magnets 232. Magnetic core 231 is composed of laminated sheets fitted and fixed to large cylinder portion 242 of bowl member 240 to oppose the outer periphery of stator core 211 via an air gap, and permanent magnets 232 are inserted into axially extending magnet holes 233 formed at magnetic core 221. Outer rotor portion 230 has an IPM (Interior Permanent Magnet) structure.

Bowl member 240 includes annular portion 243 connected to both cylindrical portions 241 and 242. A portion of clutch 260 is fixed to the rear end of annular portion 243.

Figure 3:
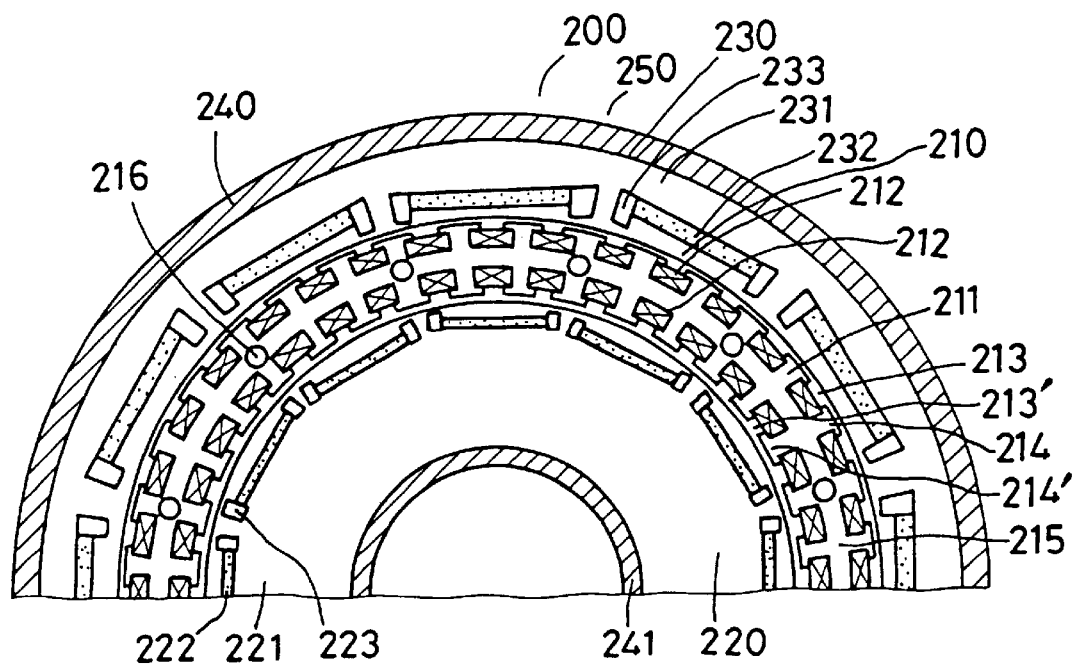
FIG. 3 is a half plan view of the portion shown in FIG. 1 cut along line 3—3.

Permanent magnets 222 and 232 are, as shown in FIG. 3, disposed at the same circumferential position at opposite sides of stator 2. Each pair of of permanent magnets 222 and 232 at the same circumferential position has the same magnetic polarity at the surface opposed to each other.

The structure of stator 210 is described in more detail with reference to FIG. 4. A winding head of the U-phase winding is vertically inserted to inner slot 213' from this side of the drawing to the other side of the drawing and moved upward in FIG. 4. In other words, the winding head is moved radially outward along the other side of the drawing, which is the surface of core back 215 of the opposite side of stator core 211 to be inserted to outer slot 213. The winding head is moved in the lamination direction of stator core 211 toward this side, and is inserted into second outer slot 213 that is three slot-pitches spaced apart from the first outer slot 213. Then, the winding head is moved along the other side of the drawing or the opposite side of the stator along the core back downward or radially inward to be inserted into another inner slot 213' to come to this side. Thereafter, the winding head is moved back in the circumferential direction by three slot-pitches to be inserted the first inner slot 213' in the vertical direction. This motion is repeated several times to form one phase winding for each magnetic pole. Subsequently, the next winding head is moved to the sixth inner slot 213' from the first inner slot 213' that has the same polarity as the first inner slot 213'. Thus, respective phase windings are formed after repeating a number of times corresponding to the same number of pairs of poles.

Figure 6:
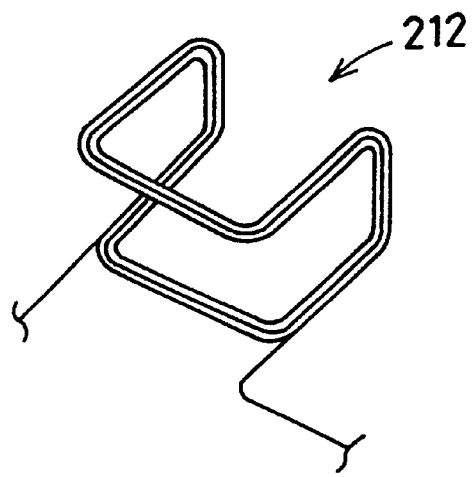
FIG. 6 is a perspective view of a portion of the stator winding shown in FIG. 1.

In other words, a phase winding for each pole forms a U-shape in cross-section at the same radial position in outer slots 213 and inner slots 213' and another U-shape in the cross-section cut in the circumferential direction, so that the phase winding can form a saddle-shape as a whole, as shown in FIG. 6.

In the same manner as above, V-phase winding and W-phase winding can be wound on stator core 211, thereby forming three-phase stator winding 212.

Figure 5:
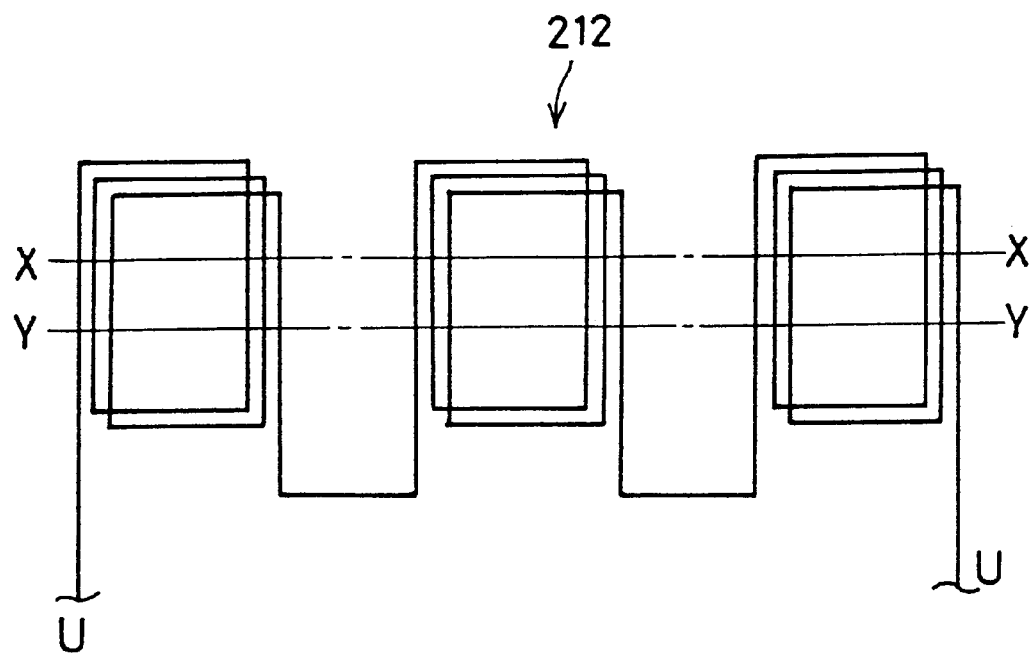
FIG. 5 is a winding diagram illustrating the stator winding shown in FIG. 1.

Instead of the above, coils can be wound separately on a coil former and bent along lines X—X and Y—Y, as shown in FIG. 5, to provide the shape shown in FIG. 6, which is fixed to stator core 211.

Figure 4:
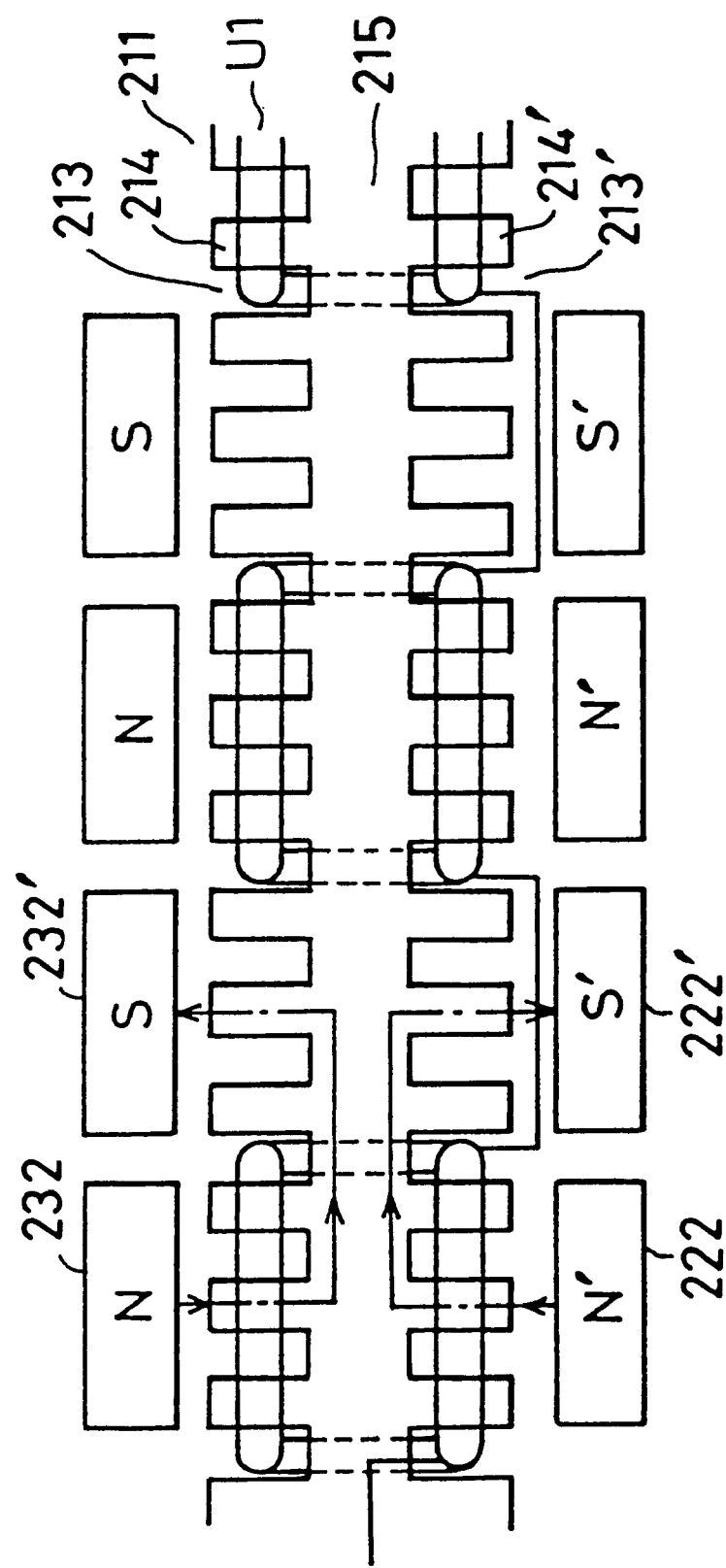
FIG. 4 is a diagram illustrating a portion (U-phase) of the stator winding shown in FIG. 1.

In FIG. 4, 222, 222' represent magnetic poles supported by inner rotor portion 220. N, N' represent magnetic North poles, and S, S' represent magnetic South poles. South poled permanent magnets 232' correspond with 222'. One-dot-chain lines having arrows represent magnetic fluxes of permanent magnets that flow through stator core 211 to interlink winding 212. When rotor 250 rotates, stator winding 212 induces current to be charged to battery 900 via converter 700.

The current is supplied to a stator 210 by controller 800 to drive rotor 250, thereby starting engine 100 or assisting wheel-driving torque. When a vehicle is slowed down, the frequency and the phase of the rotating magnetic field is controlled relative to the rotation speed of engine 100 or rotor 250 to regenerate the kinetic energy of the vehicle into electric energy of the stator 210. Rotation sensor 270 is disposed to detect a position and a speed of rotor 250.

Variations of the above described rotary electric machine is described hereafter.

Figure 7:
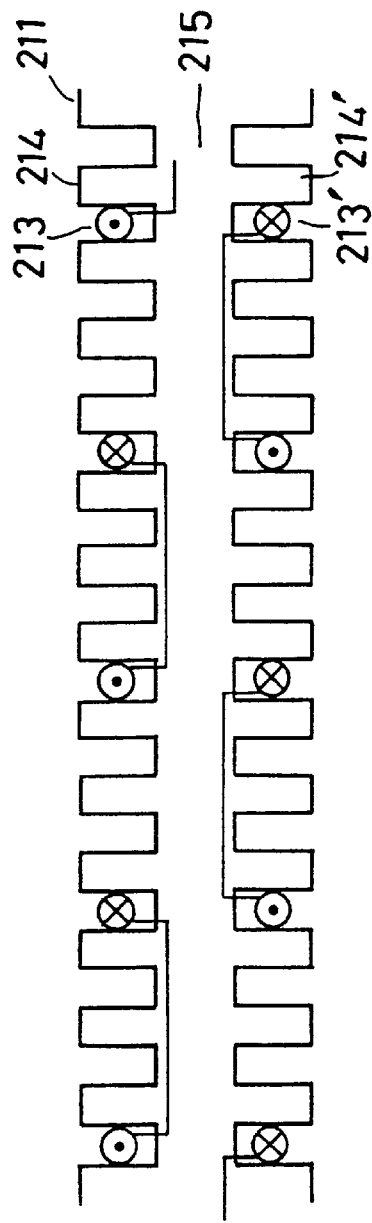
FIG. 7 is a schematic diagram illustrating a portion of the stator winding shown in FIG. 1.

A variation shown in FIG. 7 is another type of stator winding 212 of stator 210. FIG. 7 shows one phase (U-phase) winding of three-phase stator winding 212 to be wound on stator core 211.

In FIG. 7, a winding head of the U-phase winding is vertically (in the lamination direction of stator core 211) inserted to inner slot 213' from this side to the other side of the drawing. It is moved upward along the surface of core back 215 of the opposite side of stator core 211 to be inserted to outer slot 213. Then, the winding head is moved vertically toward this side. After this motion is repeated several times, it is moved from the first outer slot 213 and inserted into another outer slot 213 three slot-pitches spaced apart from the first outer slot 213. Then, the winding head is moved in the lamination direction of annular portion 243 to the other side of the drawing along the core back downward to be inserted into another inner slot 213' to come to this side. After repeating this motion several times, the head is moved back in the circumferential direction by three slot-pitches to be inserted the first inner slot 213' in the vertical direction. This motion is repeated several times to form one phase (U-phase) winding for one pole.

In the same manner as above, V-phase winding and W-phase winding can be wound on stator core 211, thereby forming three-phase stator winding 212. This way of winding forms the cross-section of the winding, that passes the same circumferential position of outer slot 213 and inner slot 213' into a square-shape. This way of winding shortens the length of one-turn coil to be wound on stator core 211. Therefore, the wire length of coil-ends can be shortened.

The position of the magnetic poles shown in FIG. 7 provides the same flow of the magnetic fluxes in stator core 211 as that shown in FIG. 4. Therefore, the operation is the same as the embodiment shown in FIG. 4.

Figure 8:
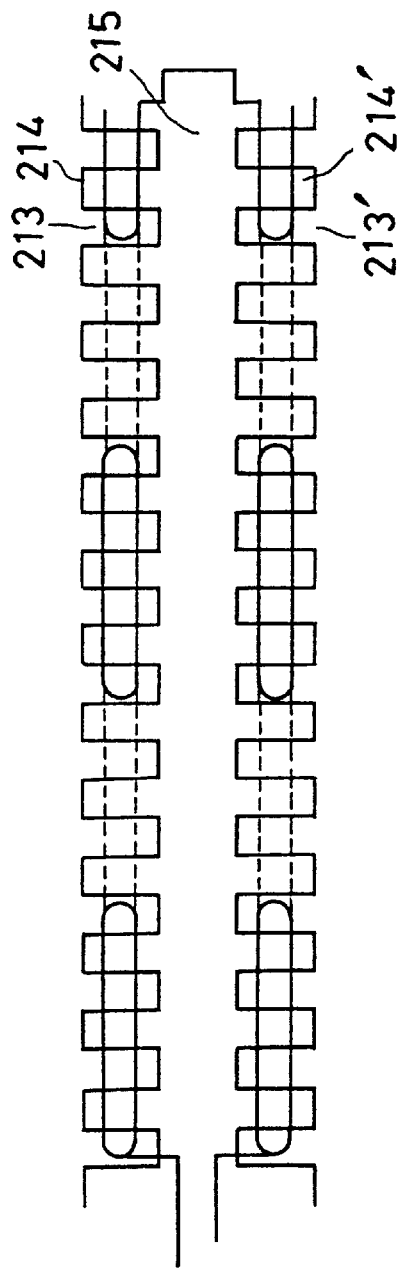
FIG. 8 is a schematic diagram illustrating a portion of the stator winding shown in FIG. 1.

Another variation is described with reference to FIG. 8. In FIG. 8, the winding head of the U-phase winding is inserted vertically (in the lamination direction of stator core 211) to outer slot 213 from this side to the other side of the drawing. It is, thereafter, moved in the circumferential direction from the first outer slot 213 and inserted into the second outer slot 213 that is three slot-pitches spaced apart from the first outer slot 213 and come to this side. It is, again, moved to the third outer slot 213 that is three slot-pitches spaced apart from the second outer slot 213 and go to the other side. This process is repeated as many times as (the number of poles)×(the number of turns) to form the outer phase winding. Thereafter, the same winding process is carried out of the inner slots 213' of stator core 211 to form the inner phase winding. The winding head of the above inner phase winding is first inserted from the first inner slot 213' opposite the first outer slot 213 of the above outer phase windings. Thus, the outer U-phase wave-winding and the inner U-phase wave-winding are formed. Next, the above outer phase-winding and inner phase winding are connected so that the direction of current of one of the phase windings in the respective slots disposed at the same circumferential position is opposite to the direction of current of the other. This completes the U-phase winding. V and W-phase windings are formed in the same manner as above.

Figure 9:
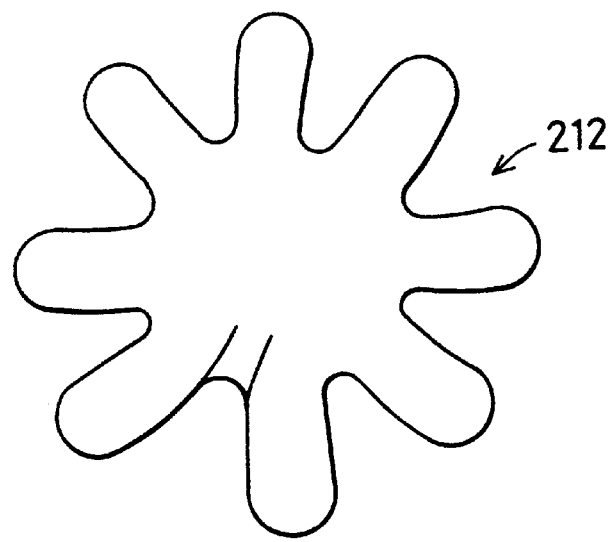
FIG. 9 is a schematic diagram illustrating a way of forming the stator winding shown in FIG. 1.
Figure 10:
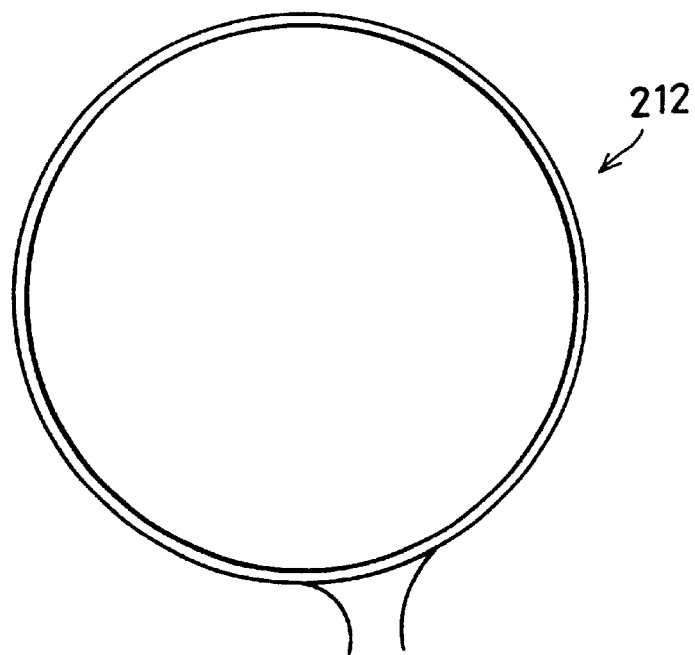
FIG. 10 is a plan view illustrating a portion of the stator winding shown in FIG. 1.

Instead of the above one-turn wave winding, a large coil of a number of turns can be formed beforehand, as shown in FIG. 10. The large coil is reshaped into a starfish-shape having feet extending at the same interval as the pole pitch, as shown in FIG. 9, and is mounted in stator core 211. A pair of windings of the same phase is respectively inserted in the inner slots and outer slots, which are disposed back to back in the radial direction. Because the direction of the current respectively flowing in the pair of windings is opposite to each other, the windings can operate in the same manner as the winding shown in FIGS. 4 and 7.

Stator winding 212 can be changed from the above full-pitch winding to a short-pitch winding. The number of slots per-pole-per-phase can be changed to two or more.

Inner and outer rotor portions 220 and 230 can have a SPM (Surface Permanent Magnet) structure.

Figure 11:
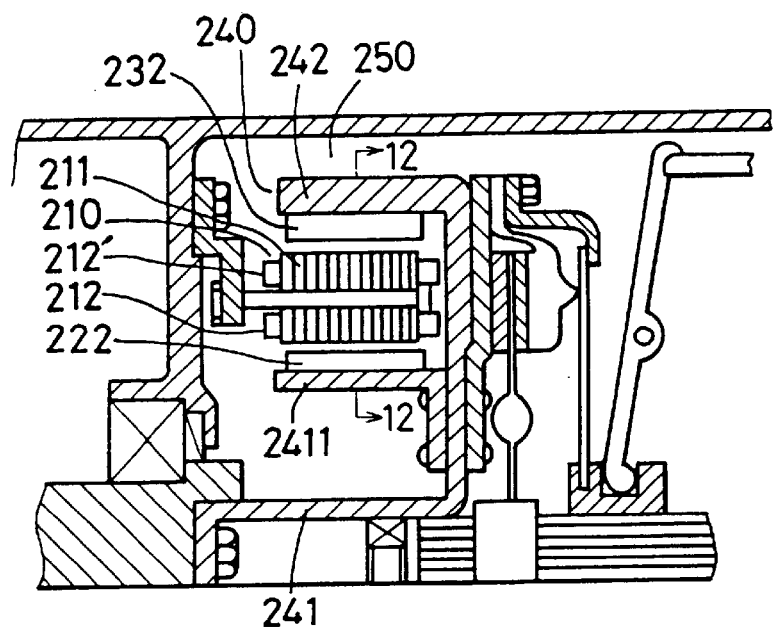
FIG. 11 is a radially cut schematic cross-sectional view of a vehicle rotary electric machine according to a second embodiment of the invention.
Figure 12:
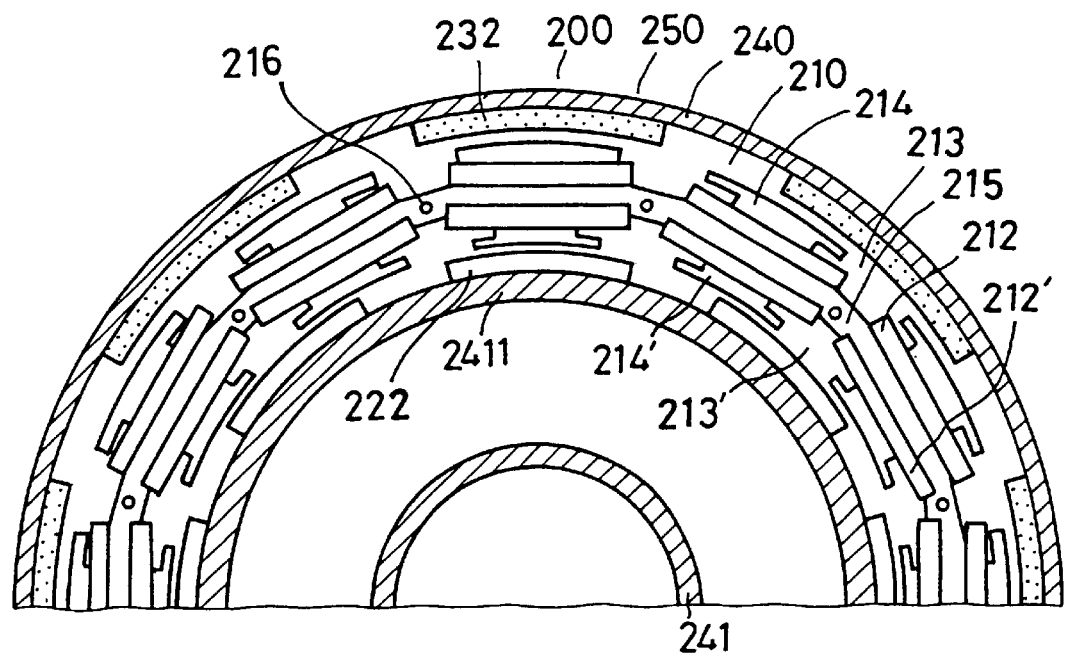
FIG. 12 is a half cross-sectional plan view of a portion shown in FIG. 11 cut along line 12—12.

A vehicle rotary electric machine according to a second embodiment of the invention is described with reference to FIGS. 11 and 12.

A plurality of outer and inner slots 213, 213' is formed in the circumferential direction at predetermined electric angular pitches, and teeth 214' and 214 are respectively disposed at the same circumferential positions of core back 215. Concentrated phase windings 212, 212' are mounted on teeth 214, 214', which are spaced apart 120° in electric angle from each other to form stator winding 212 of a three-phase winding. Permanent magnets 222, 232 are disposed at predetermined equal pitches in the circumferential direction at the inner and outer surfaces of stator core 211 to form outer and inner rotor portions. Permanent magnets 222, 232 are polarized alternately in the circumferential direction so that the polarity of the surfaces of those disposed at the same angular position can be the same. Permanent magnets 222, 232 are fixed to cylindrical portions 2411, 242 of bowl-shaped yoke 240. Cylindrical portion 2411 is fixed to an annular portion of bowl member 240, and outer cylindrical portion 242 corresponds to the large cylinder portion of the first embodiment. Inner cylindrical portion 241 corresponds to the small cylinder portion of the first embodiment.

Figure 13:
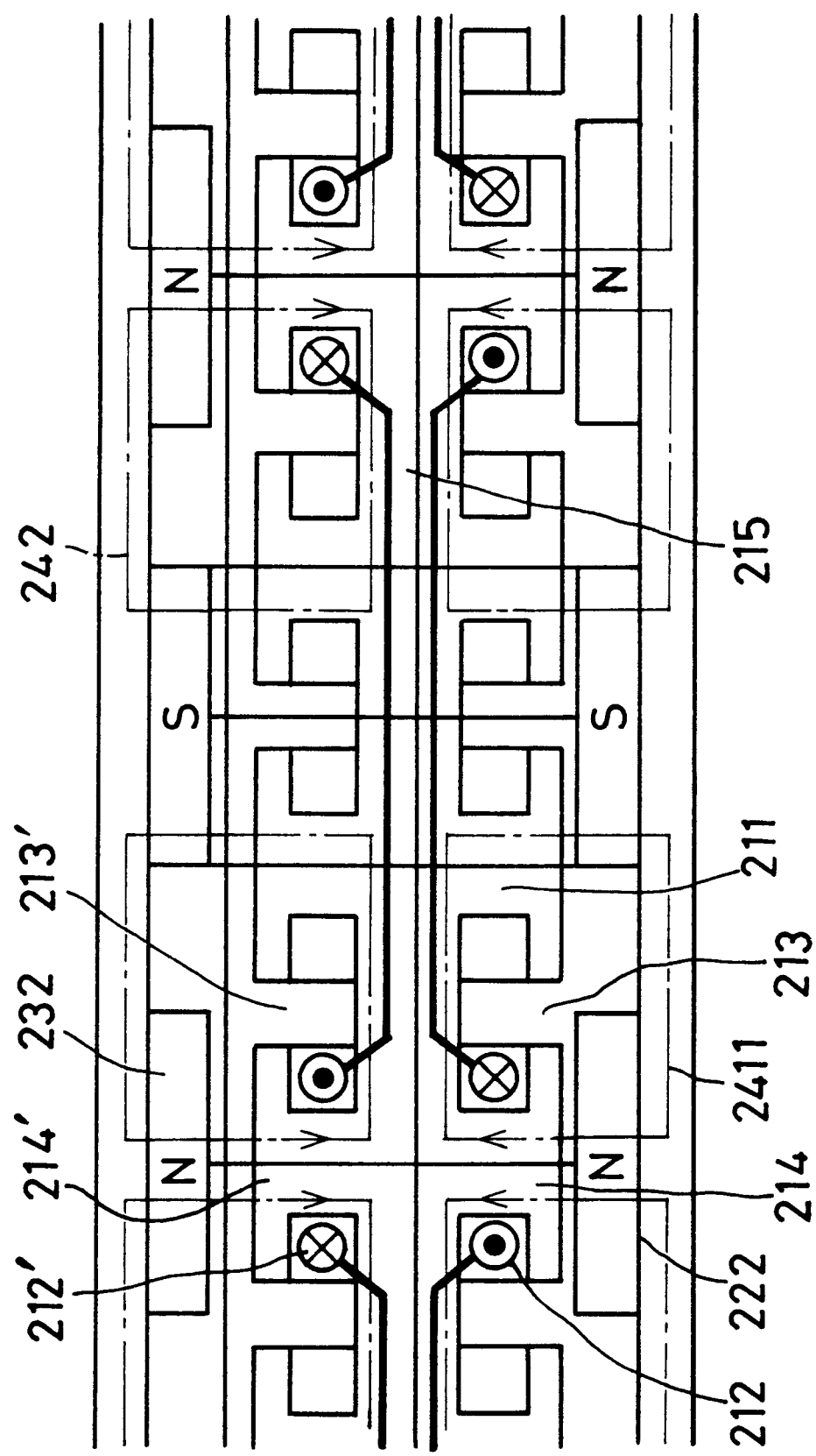
FIG. 13 is a schematic winding diagram of the stator winding relative to magnetic poles shown in FIGS. 11 and 12.

Relation between stator winding 212 and the magnetic poles is described with reference to FIG. 13.

A plurality of pairs of magnetic poles 222 and 232 is disposed opposite teeth 214, 214' so that the opposing surfaces of each pair of magnetic poles 222, 232, disposed at the same angular position in the circumferential direction, can have the same magnetic polarity. The magnetic polarity alternates between the north and the south in the circumferential direction. A half of the U-phase winding is wound on as many teeth 214' as a half of the number of the magnetic poles in the same direction. As shown in FIG. 13, the U-phase winding is wound on teeth 214 in the direction opposite that wound on teeth 214'. The winding ends of the concentrated windings wound on teeth 214, 214' are connected to each other to form the U-phase winding. Thus, the induced voltage of the concentrated windings wound on teeth 214, 214' are added to each other. In the same manner, V-phase winding and W-phase winding are wound on respective teeth 120°-electric-angle spaced apart from these teeth in the opposite circumferential directions. Thus, stator winding 212 is completed.

When an engine rotates rotor 250 via crankshaft 101, voltages induced in the radially inner windings and radially outer windings are added.

Since the phase windings are formed of concentrated windings, the coil ends can be made small, and the axial size of a machine can be reduced.

A vehicle rotary electric machine according to embodiment 3 is described with reference to FIG. 14.

Inner rotor portion 220 and outer rotor portion 230 of the rotor have a synchronous reluctance structure. Rotor portions 230 and 220 respectively have magnetic cores 231, 221, in which arc-shape slits 233, 223 and a plurality of arc-shaped magnetic paths 234, 224 are formed in a coaxial arrangement. In other words, magnetic salient portions are formed at predetermined pitches in the circumferential direction on the peripheral surfaces (electromagnetic connection surface) of magnetic cores 231 and 221 opposite stator 210. Thus, rotor 250 is driven in synchronism with the rotating magnetic field provided by the stator, and stator winding 212 generates electric power.

Inner rotor portion 220 and outer rotor portion 230 are formed of only electromagnetic sheets. Therefore, this rotor is resistant to the centrifugal force. In this rotor, two rotor portions 220 and 230 are disposed in the radial direction and the stator is formed in a unit, so that output-power-density can be improved.

Figure 15:
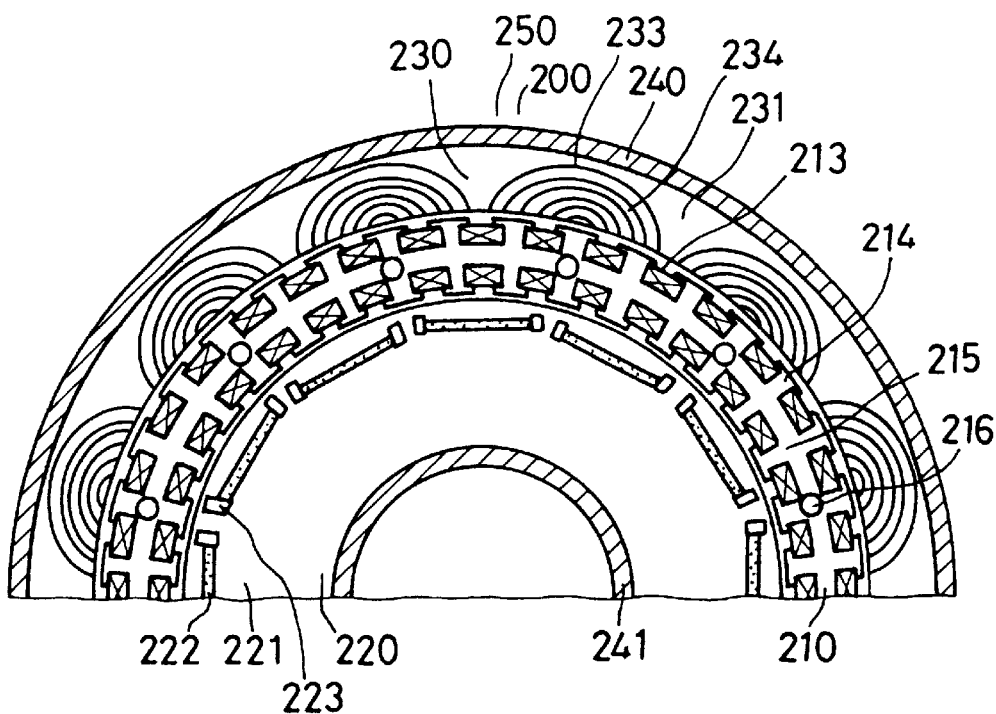
FIG. 15 is a half-cross-sectional schematic diagram of a vehicle rotary electric machine according to a fourth embodiment of the invention.

A vehicle rotary electric machine according to embodiment 4 is described with reference to FIG. 15.

Figure 14:
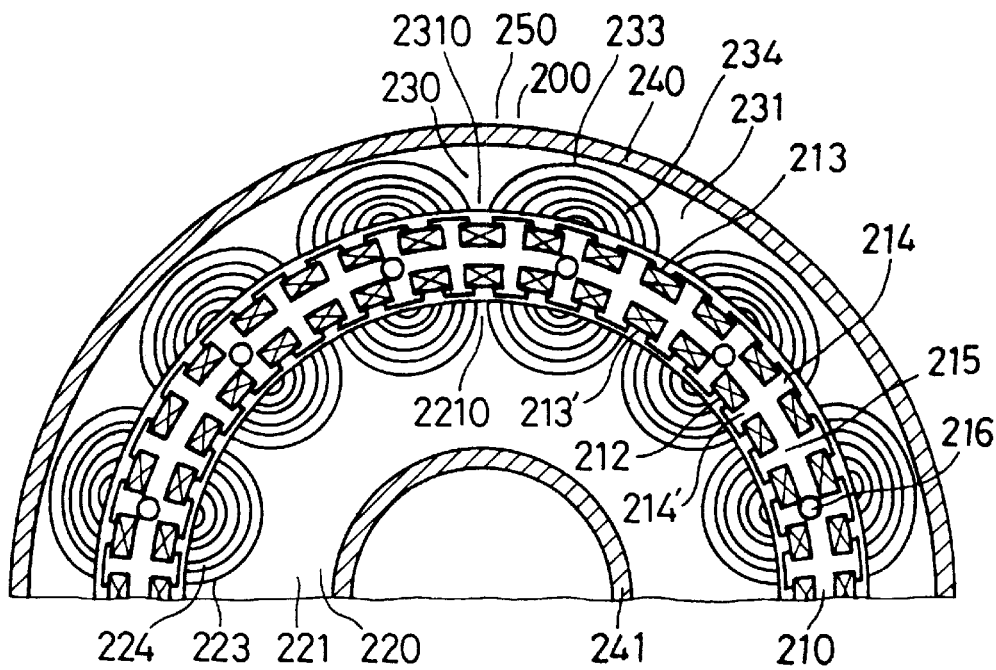
FIG. 14 is a half-cross-sectional schematic diagram of a vehicle rotary electric machine according to a third embodiment of the invention.

The inner rotor portion has the same permanent magnets as those shown in FIG. 14. Therefore, output power density between the inner peripheral surface of the stator core and the inner rotor portion can be increased.

Figure 16:
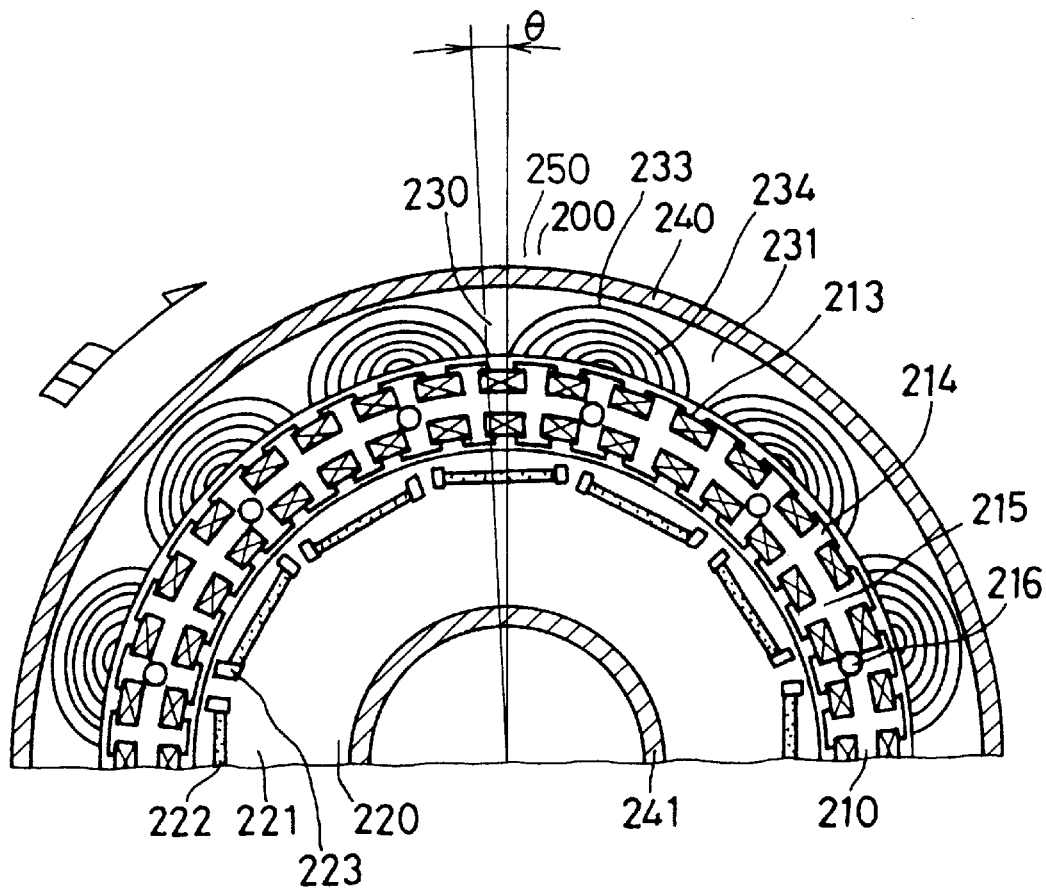
FIG. 16 is a half-cross-sectional schematic diagram of a vehicle rotary electric machine according to a fifth embodiment of the invention.

A vehicle rotary electric machine according to embodiment 5 is described with reference to FIG. 16.

Figure 17:
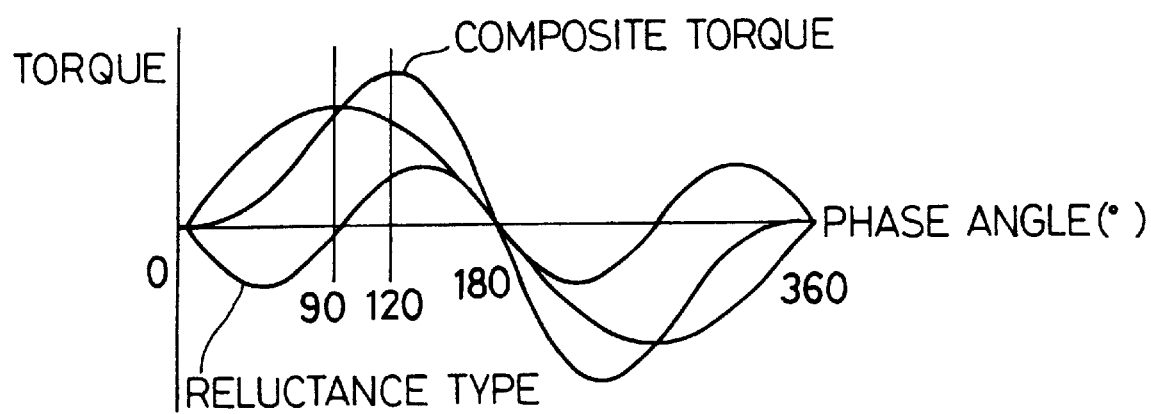
FIG. 17 is a diagram showing a relationship between phase angles and the torque generated by the machine shown in FIG. 15.
Figure 18:
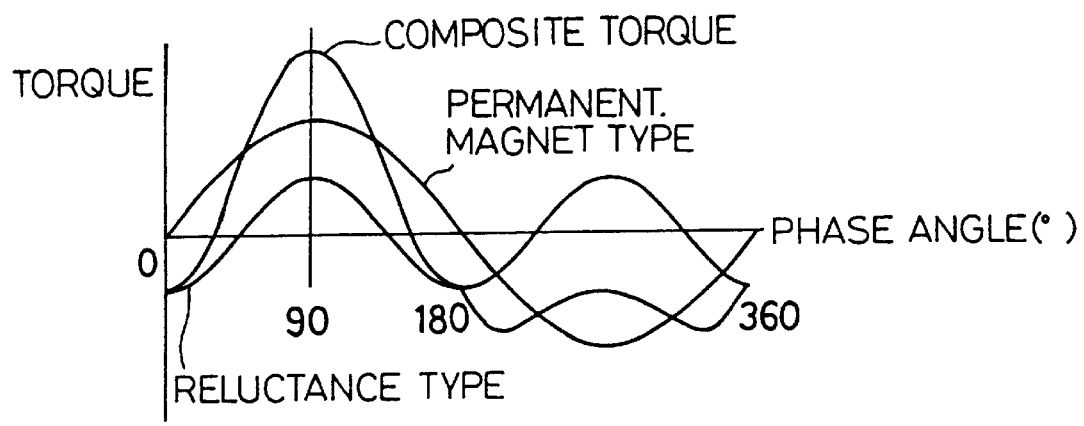
FIG. 18 is a diagram showing a relationship between phase angles and the torque of the machine shown in FIG. 16.

The center of permanent magnets 222, which is the magnetic salient pole of inner rotor portion 220, is set to 45°–90° in electric angle retard from the circumferential center of the magnetic salient pole of outer rotor portion 230. If the phase-angle is controlled by a single stator winding, the amounts of torque generated by two rotor portions 220, 230 are added to each other, thereby increasing the output torque. FIG. 17 shows relationship between the torque and the phase angle of the rotary electric machine shown in FIG. 15. FIG. 18 is the relationship between the torque and the phase-angle of the rotary electric machine shown in FIG. 16.

Figure 19:
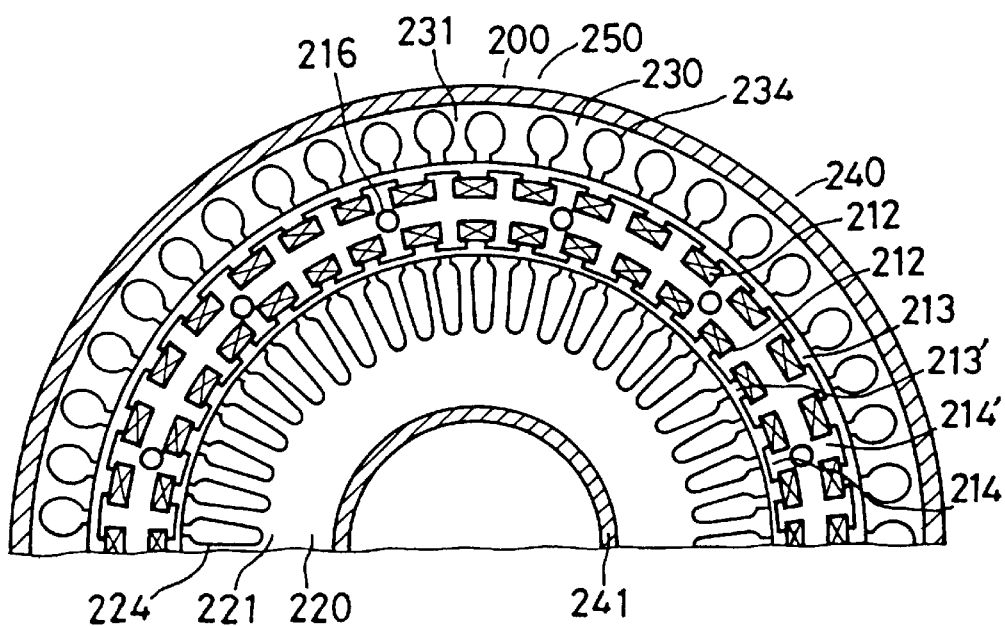
FIG. 19 is a radially cut half-cross-sectional diagram of a vehicle rotary electric machine according to a sixth embodiment of the invention.

A vehicle rotary electric machine according to sixth embodiment is described with reference to FIGS. 19 and 20.

Common stator winding 212 is mounted on the inner and outer peripheral portions of stator 210, and squirrel-cage type inner rotor portion 220 of the induction machine and outer rotor portion 230 are respectively opposed to the inner peripheral surface and the outer peripheral surface of stator 210. Both inner and outer rotor portions 220 and 230 with the same number of conductor members are formed to be similar to each other to provide electromagnetic induction by the single stator winding.

Figure 20:
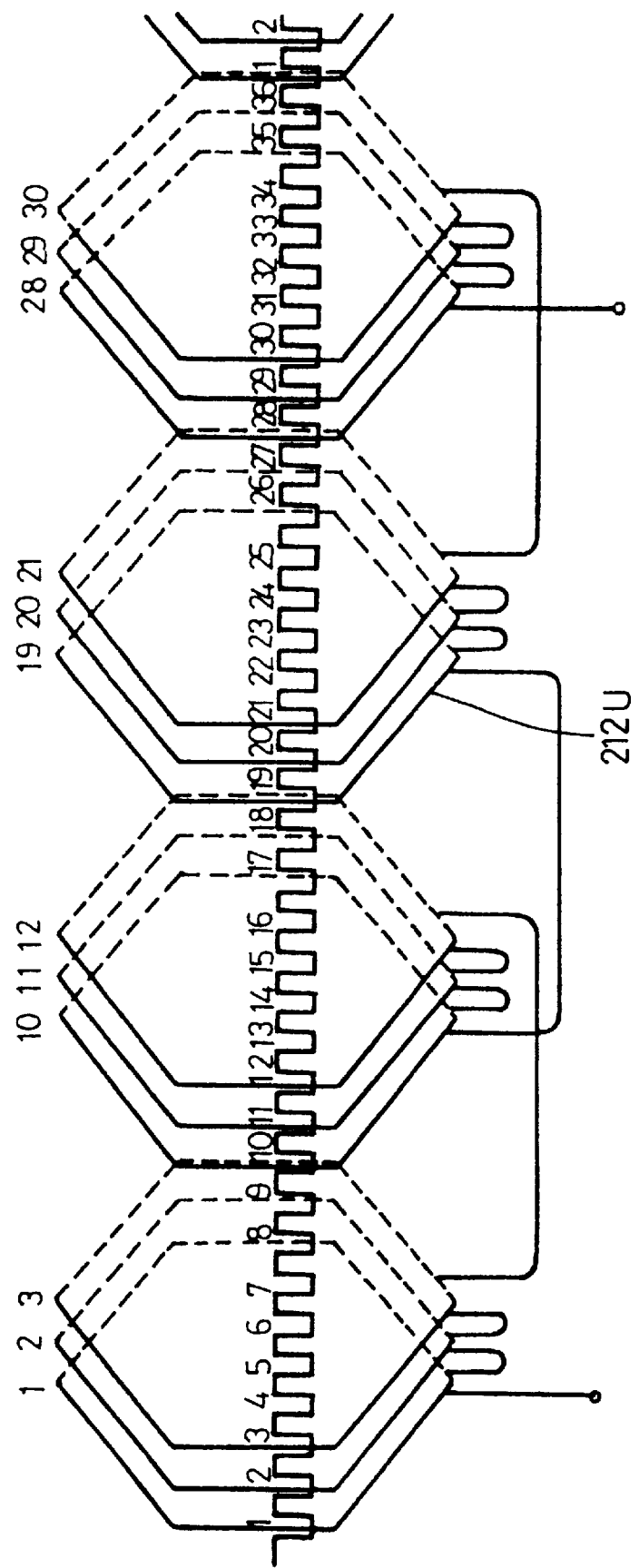
FIG. 20 is a winding diagram of the stator winding shown in FIG. 19.

A winding diagram of stator winding 212 is shown in FIG. 20. Stator winding 212 is a three-phase 78%-short-wound distribution winding for a four poled rotor and 36-slot-stator. Although only a U-phase winding is shown here, V-phase and W-phase windings are respectively mounted in the slots having $2\pi/3$ phase-difference from the U-phase winding. Stator winding 212 is formed into a U-shape, as shown in FIG. 6, to be inserted into the slots formed on the inner and outer peripheries of the stator core.

Thus, single stator winding 212 drives inner and outer rotor portions 220 and 230 to drive the engine or assist the operation thereof. This structure shortens the axial length of the machine.

Figure 23:
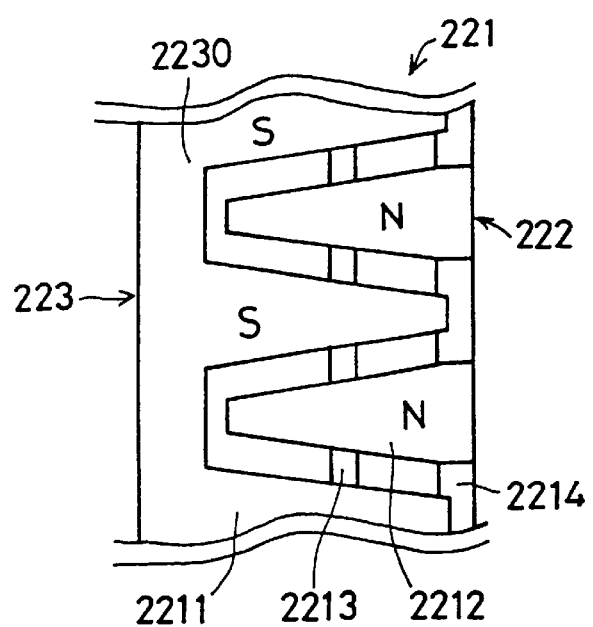
FIG. 23 is a fragmentary schematic side view of a circumferential portion of the inner rotor portion shown in FIG. 21.

A vehicle rotary electric machine according to a seventh embodiment is described with reference to FIGS. 21–23.

Figure 21:
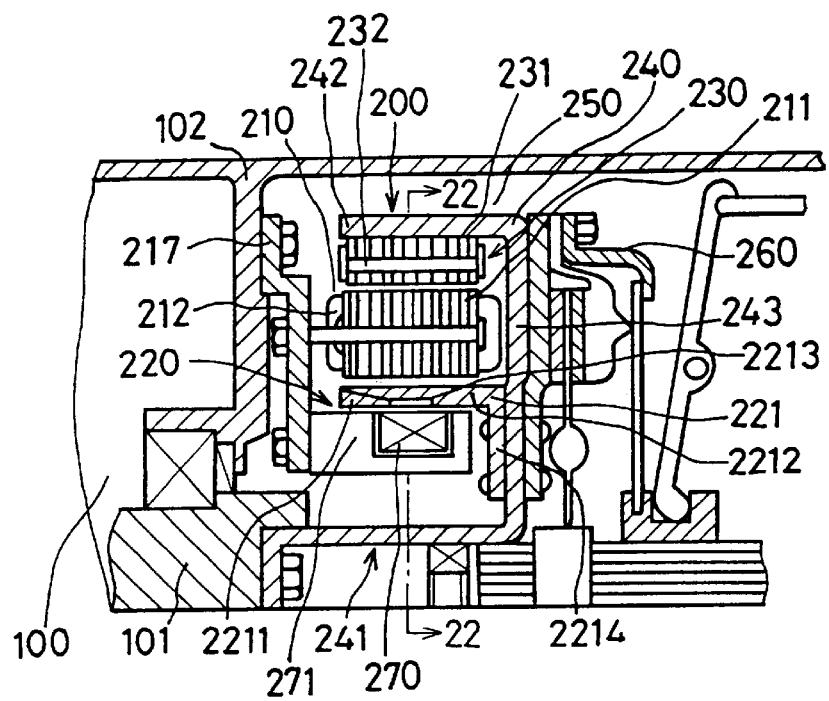
FIG. 21 is a half-cross-sectional schematic diagram of a driving unit in which a vehicle rotary electric machine according to a seventh embodiment of the invention is mounted.
Figure 22:
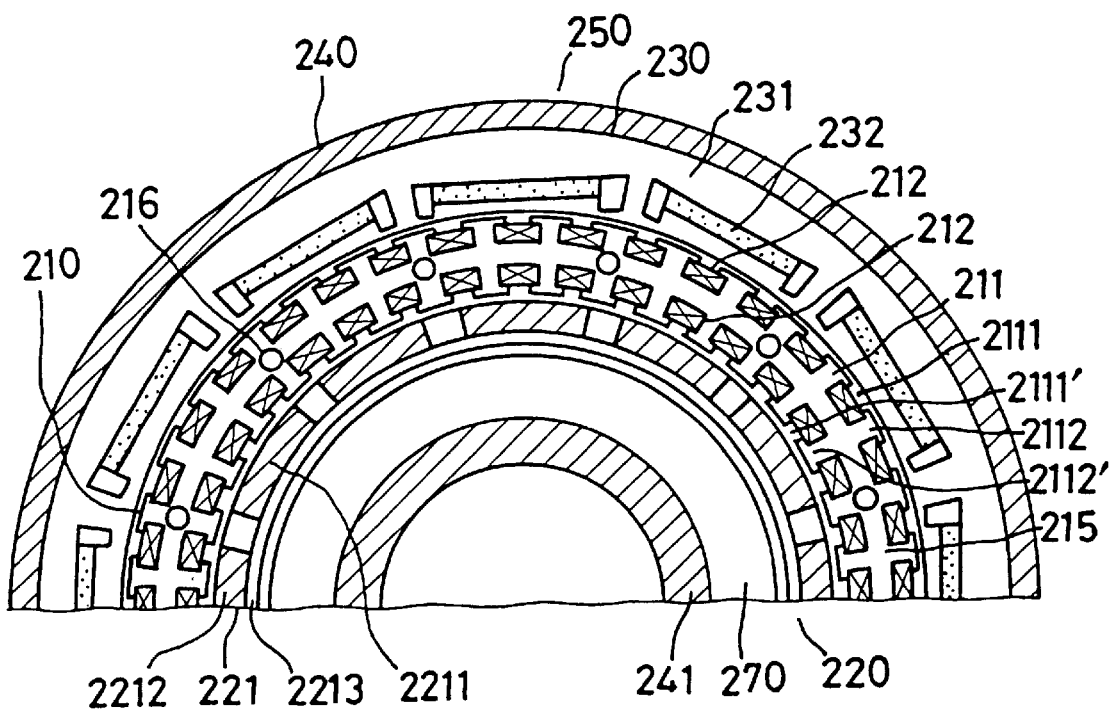
FIG. 22 is a half cross-sectional plan view of a portion shown in FIG. 21 cut along line 22—22.

As shown in FIG. 21, machine 200 is mounted between engine 100 and a transmission unit (not shown). As shown in FIG. 23, a circumferential portion of the magnetic poles that are opposed, via an air gap, to the electromagnetic connection surface formed at the inner periphery of stator 210.

Rotary electric machine 200 includes stator 210, rotor 250, and field coil 270. Rotor 250 is connected, at the back thereof, to the transmission unit to transmit the torque thereof.

The stator includes cylindrically laminated magnetic stator core 211 and stator winding 212 mounted on the inner and outer peripheries thereof, which form inner and outer electromagnetic connection surfaces.

Slots 2111 and teeth 2112 are respectively formed at the outside of core back 215, and slots 2111' and teeth 2112' are respectively formed at the in side of core back 215. The number and the circumferential position of inner slots 2111' and outer slots 2111 are the same.

Bolts 216 penetrate core back 215 of stator core 211 in the axial direction to fix stator core 211 in a unit and fix the stator, via stator supporting frame 217, to engine housing 102.

Induction type inner rotor portion 220 is opposed to the above-described inner electromagnetic connection surface. This inner rotor portion 220 includes induction member 221, field coil 270, and magnetic passage member 271, thereby forming a Lundell-type pole structure. As shown in FIG. 23, induction member 221 includes N-pole portion 222 and S-pole portion 223, both of which are made of soft iron, and non-magnetic ring-shaped connection member 2213.

N-pole portion 222 includes ring-shaped support portion 2214 and a plurality of claw pole portions 2212 that extend frontward from the outer periphery of ring-shaped support portion 2214 at certain circumferential intervals. S-pole portion 223 includes cylindrical portion 2230, a plurality of claw pole portions 2211 that extend rearward from the back of cylindrical portion 2230, at certain circumferential intervals. Claw pole portions 2211, 2212 interleave with each other from positions spaced apart at a certain distance.

Claw pole portions 2211, 2212 have ring-shaped groove or cavity at the axially central portion facing the inner surface thereof to accommodate connection member 2213, which is soldered or welded to the groove. Ring-shaped support member 2214 is fixed to magnetic core of bowl member 240.

Field coil 270 is housed in a groove formed at outer periphery of cylindrical magnetic passage member 271 that is opposed, via an air gap, to the inner surface of induction member 221. Magnetic passage member 271, which is a yoke, has a front surface fixed to stator supporting frame 217.

Permanent-magnet-type outer rotor portion 230 is opposed to the outer magnetic connection surface via an air gap. Outer rotor portion 230 is comprised of cylindrical magnetic core 231 and a plurality of permanent magnets inserted into axially extending holes thereof to provide alternating magnetic poles in the circumferential direction at certain intervals, in an IPM (interior permanent magnet) arrangement. Magnetic core 231 is fitted to outer cylindrical portion 242 of bowl member 240 and fixed thereto. Magnetic core 231 is fixed to crankshaft 101 at inner cylindrical portion 241.

Bowl member 240 has inner cylindrical portion 241, which is connected to the back end of crankshaft 101 and extends backward, and annular portion 243 extending radially outward from the back of inner cylindrical portion 241 to be connected to the back end of outer cylindrical portion 242. A portion of clutch 200 is fixed to the back end of annular portion 243 of bowl member 240, and ring-shaped support member 2214 is fixed to the front end thereof.

As shown in FIG. 24, the winding head of the U-phase winding is inserted vertically, or in the lamination direction of stator core 211, to slot 2111' from this side to the other side of the drawing. The winding head is, thereafter, moved along the back of core back 2113 in the circumferential direction from the inside slot and radially upward to be inserted into the outside slot 2111 and come through slot 2111 to this side. The winding head is moved through slot 2111' and the same winding step is repeated predetermined times. Thereafter, the winding head that comes out of slot 2111 is moved to another slot 2111 that is three slot-pitches spaced apart from the former slot 2111, and through the lamination direction to the other side. Thereafter, down along core back 2113, the winding head is moved to slot 2111'. This winding process is repeated a predetermined number of times, and then moved to slot 2111' that is three-slot pitch spaced apart therefrom to repeat the same winding process to form one-phase winding. Thus, the outer U-phase (wave) winding and the inner U-phase wave-winding are formed.

Subsequently, inner and outer rotor portions 220 and 230 are respectively opposed to a pair of inner and outer electromagnetic connection surfaces of stator 210. Permanent magnets 232 and induction member 221 are disposed in the circumferential direction on the opposite sides of the stator so that poles of the same polarity are opposed to each other via the stator, as shown in FIG. 24. N, N' represent the magnetic N-pole, and S, S' represent the magnetic S-pole in FIG. 24. The magnetic flux generated by the field current of field coil 270 polarizes magnetic pole 2211 of induction member 221 into S' and magnetic pole 2212 thereof into N'. In FIG. 24, a one-dot-chain line represents a portion of the magnetic flux.

Both the magnetic flux of outer rotor portion 230 with the outer permanent magnets and the magnetic flux of inner rotor portion 220 with the inner induction member interlink stator coils 212.

Figure 25:
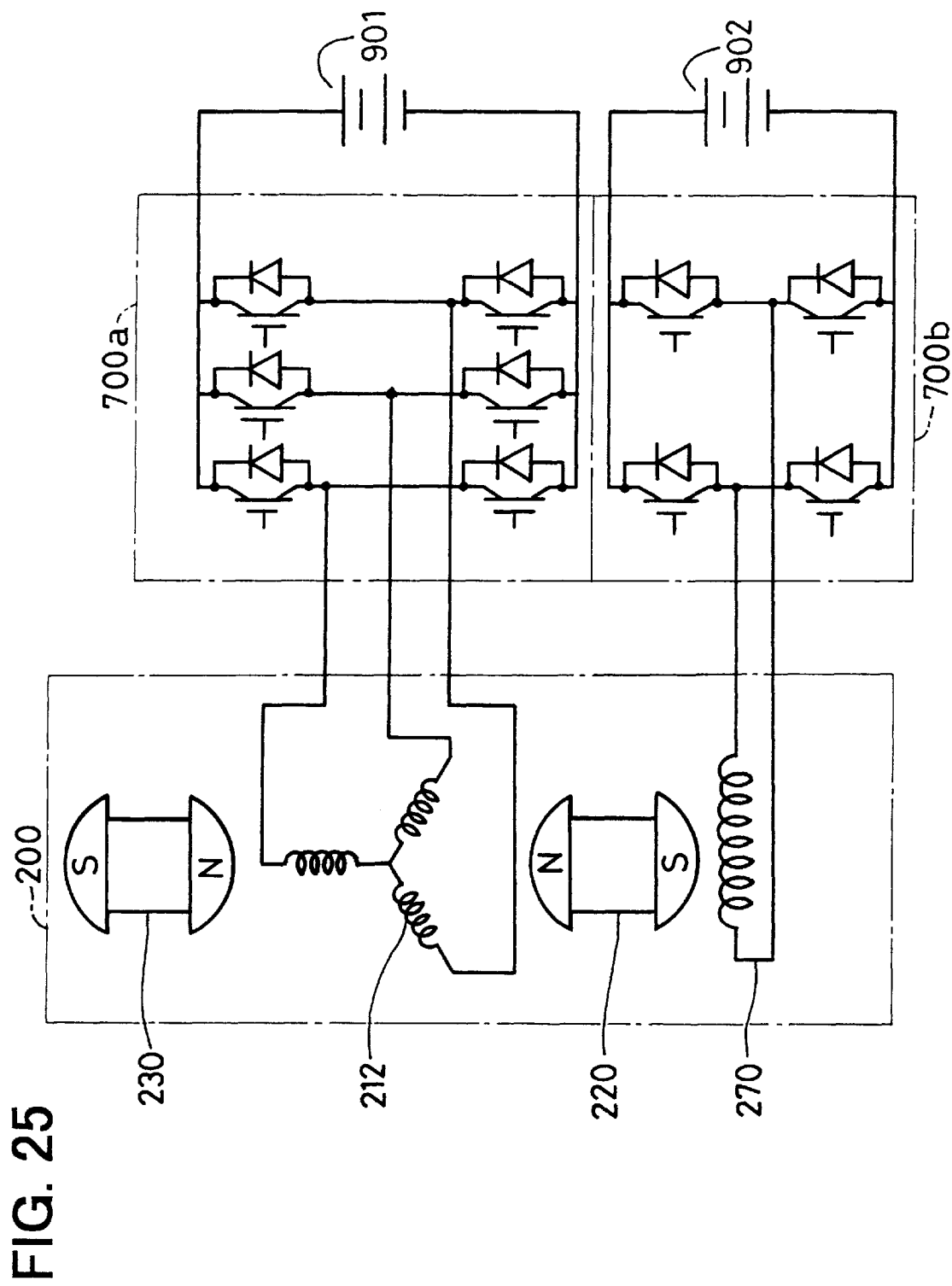
FIG. 25 is a circuit diagram of the machine shown in FIG. 21.

The operation of this embodiment is described with reference to FIG. 25.

Circuit 2000 of the rotary electric machine includes inner rotor portion 220 having permanent magnets, outer rotor portion 230 having induction members, and field coil 270. A well-known two-way semiconductor-converter 700a is connected to circuit 2000 to convert AC voltage induced in stator winding 212 to DC voltage to be charged to battery 901 or DC voltage of battery 901 into AC power to be supplied to stator winding 212.

A well-known semiconductor H-type bridge circuit 700b is also connected between field coil 270 and battery 902. Field current is PWM-controlled by switching elements of bridge circuit 700b and supplied to field coil 270. Semiconductor H-type bridge 700b can reverse the flow direction of the current to reverse the polarity of the induction member, whenever necessary.

This rotary electric machine uses both outer and inner rotor portions 230 and 220 for excitation when a large output power is necessary. It is not possible to change the magnetic field of outer rotor portion 230. However, it is possible to control the output power or motor torque by changing the amount of the field current supplied to field coil 270 and the direction thereof so as to change the magnetic field and the polarity of inner rotor portion 220. Thus, the output power or the motor torque is controlled.

If the output current is small although engine speed is high, reversed current is supplied to field coil 270 to reduce total output voltage of whole stator winding 212, so that output current can be controlled at a desired level. In other words, the magnetic field of inner rotor portion 220 can be controlled by control of the current supplied to field coil 270, so that the output power of the rotary electric machine can be controlled. Because the induction member is mounted not on the outer rotor portion 230, which is subjected to a comparatively large centrifugal force, but on inner rotor portion 220, which is subjected to comparatively small centrifugal force. Therefore, it is easy to install field coil 270 and its core 271 to the rotary electric machine.

Controller 800, which corresponds to the control circuit of the invention, controls field current. Controller 800 may control the field current according to a difference between the output voltage of stator winding 212 and a reference voltage. The output current of stator winding 212 can be controlled if current-phase-angle of stator winding 212 is changed. This can be added to the above output voltage control. For example, a vibration control, in which a control torque that is reverse in direction to the engine torque is provided, is carried out by control of the output current, and the output voltage control is carried out by control of the field current.

The output voltage of the machine, which is carried by control of the field current, is well known. Therefore, a detail description is omitted here.

Instead of the inside slots and outside slots that are formed at the same angular position in the preceding embodiments, the inside and outsides slots can be shifted in the circumferential direction by a half-slot pitch. The half-slot-pitch shift increases the average radial width of the core back, so that iron loss can be reduced. Accordingly, the output power and motor torque can be increased. In this variation, the stator winding is inclined by a distance in the circumferential direction when it is extended along the end surface of stator core 211 of stator 210.

Figure 26:
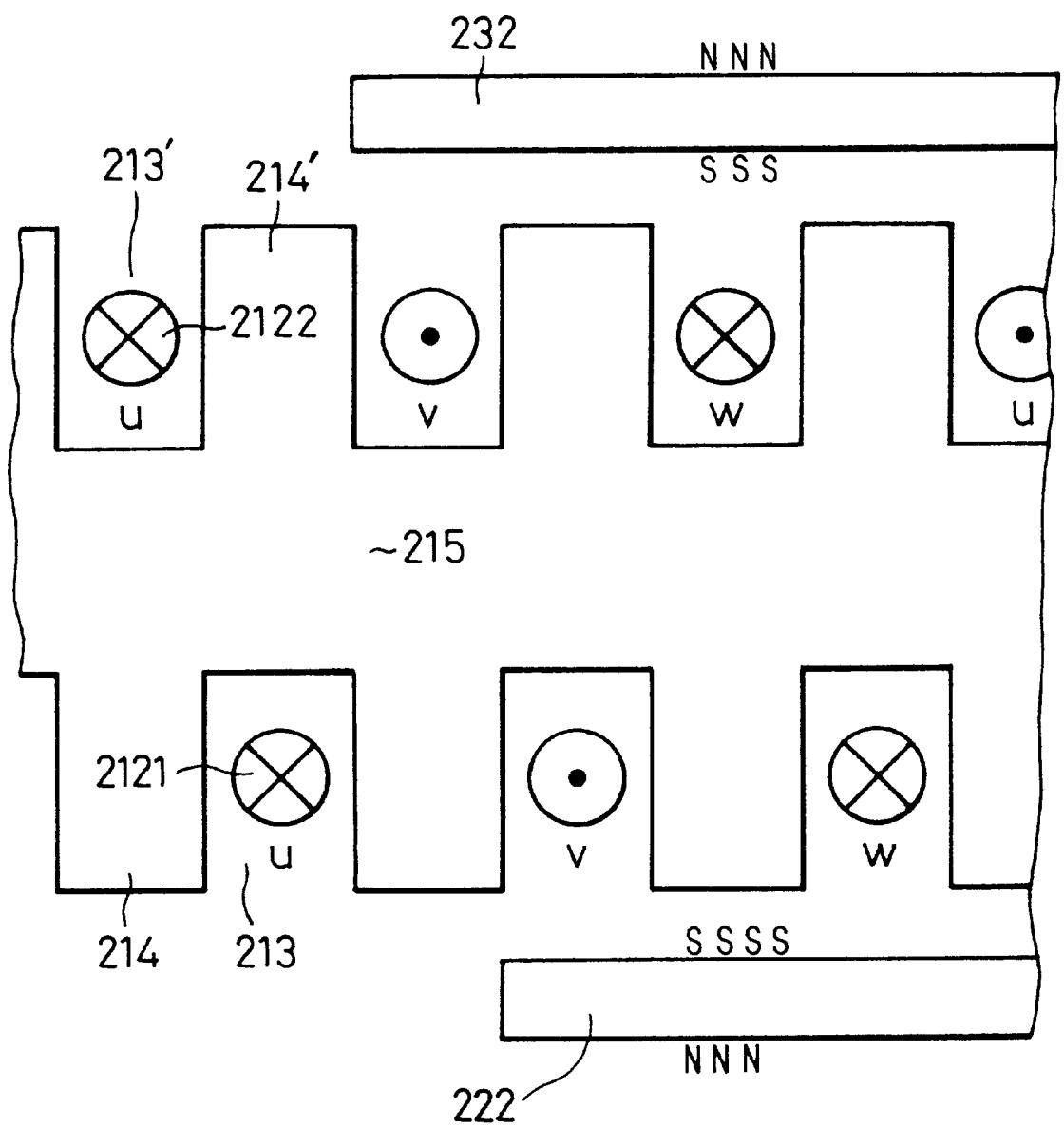
FIG. 26 is a fragmentary schematic view illustrating a circumferential portion of a stator core according to a variation of the embodiments.

If the inside slots are shifted in the circumferential direction by a half-slot pitch, the inside portion of the stator winding is also shifted by a half-slot pitch, and magnetic pole portion 220 is also shifted by a half-slot pitch, as shown in FIG. 26.

Figure 27:
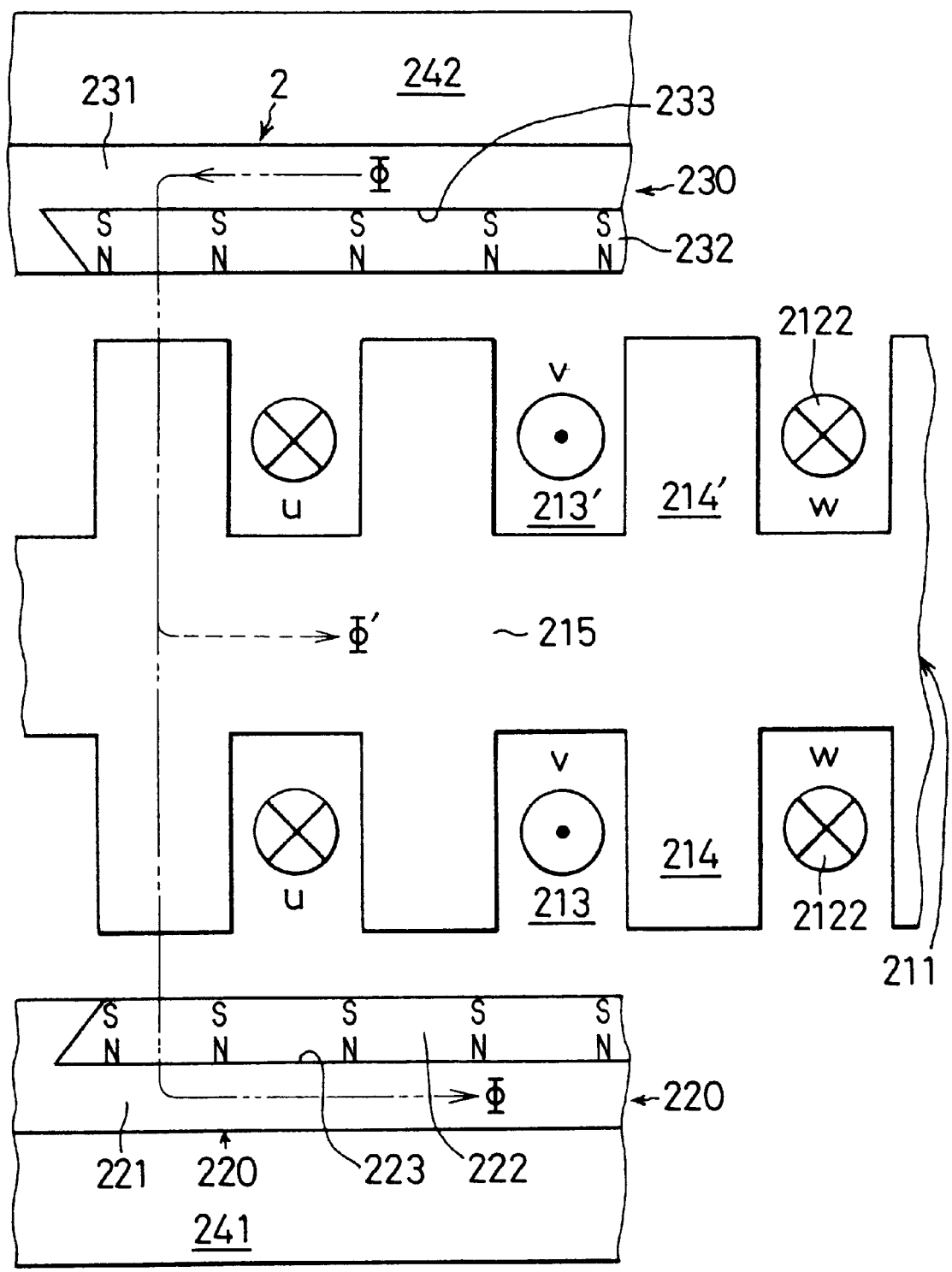
FIG. 27 is a fragmentary schematic view illustrating a circumferential portion of a stator core according to a variation of the above embodiments.

The magnetic poles of inside rotor portion 220 and the magnetic poles of outside rotor portion 230 are, polarized so that the surface at the same angular position opposite stator 210 can have the same polarity. It is also possible that one surface has an opposite polarity to the other surface. If the surface of rotor portion 220 is polarized to have the opposite polarity, a unitary common-close-magnetic-path that passes around both rotor portions 220 and 230 and stator 210 disposed between them is formed. Because the core back is supplied with a magnetic flux that corresponds to a difference in magnetic flux between the magnetic poles of both rotor portions, it is possible to reduce the radial thickness of the core back and the iron loss thereof, as shown in FIG. 27.

The inside and outside portions of the stator coils are wound so that they can induce voltages in the same direction and connected at the winding end of one and the winding head of another in series to form a multi-phase winding.

The magnetic poles of inside rotor portion 220 and the magnetic poles of outside rotor portion 230 are polarized so that the surface opposite stator 210 can have the same polarities. It is also possible that the surface opposite stator 210 has opposite polarities.

If the surface is polarized to have the opposite polarity, a unitary common-close-magnetic-path that passes around both rotor portions 220 and 230 and stator 210 is formed. Because the core back is supplied with a magnetic flux that corresponds to a difference in magnetic flux between the magnetic poles of both rotor portions, it is possible to reduce the radial thickness of the core back and the iron loss thereof.

The inside and outside stator coils are wound so that they can induce voltages in the same direction and connected at the winding end of one and the winding head of another in series to form a multi-phase winding.

In the above embodiments, the magnetic poles of inside rotor portion 220 and the magnetic poles of outside rotor portion 230 are polarized so that the surface opposite stator 210 can have the same polarities. It is also possible that the surface has opposite polarities.

If the surface has opposite polarities, a unitary common-close-magnetic-path that passes around both rotor portions 220, 230 and stator 210 disposed between them is formed. Because the core back is supplied with a magnetic flux that corresponds to a difference in magnetic flux between the magnetic poles of both rotor portions, it is possible to reduce the radial thickness of the core back and the iron loss thereof.

The inside and outside portions of stator coils are wound so that they can induce voltages in the same direction and connected at the winding end of one and the winding head of another in series to form a multi-phase winding.

A vehicle rotary electric machine according to an eighth embodiment is described hereafter.

Figure 2:
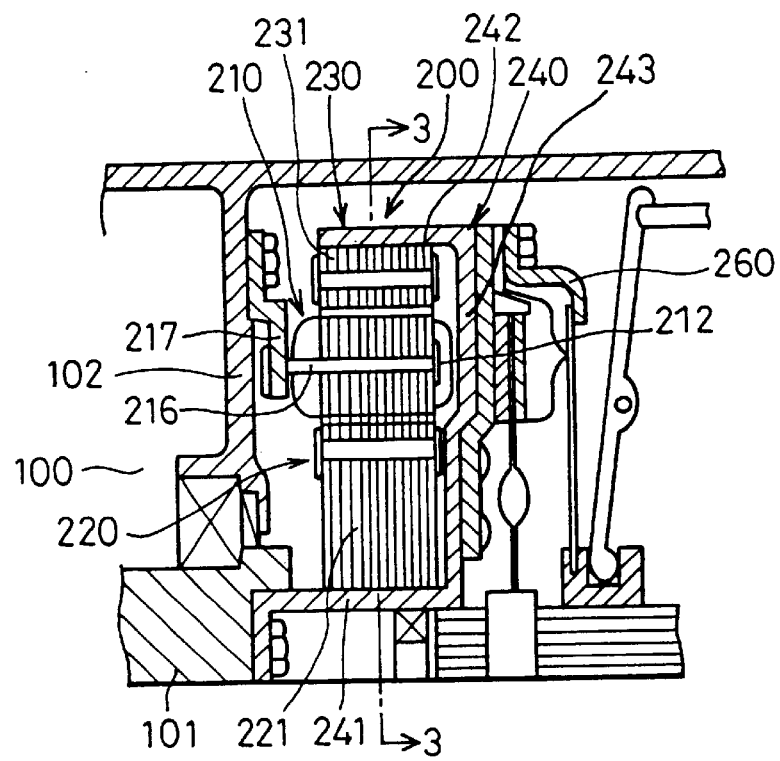
FIG. 2 is a radially cut cross-sectional schematic view of the machine shown in FIG. 1.

A radially cut cross-sectional view of the rotary electric machine according to the eighth embodiment is substantially the same as shown in FIG. 2.

Figure 28:
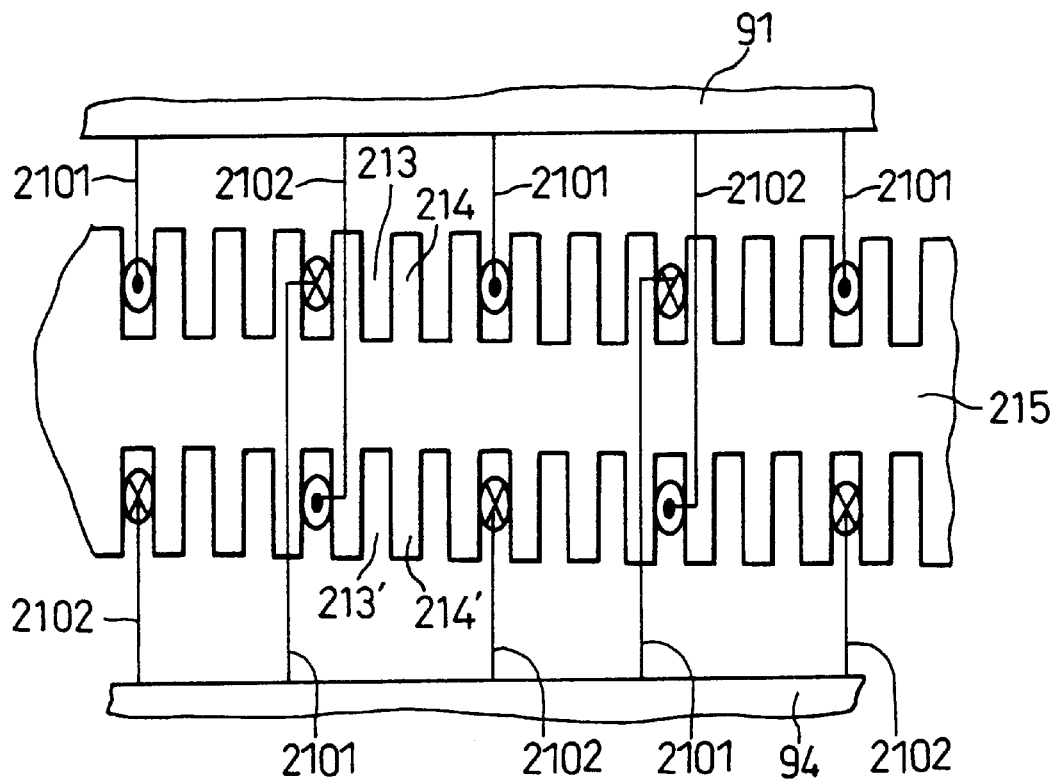
FIG. 28 is a partially exploded view of a stator of a vehicle rotary electric machine according to an eighth embodiment of the invention.

As shown in FIG. 28, a plurality of outer slots 213 and teeth 214 which are formed at the outer peripheral portion thereof at equal pitches, and a plurality of inner slots 213' and teeth 214' which are formed at the inner peripheral portion thereof at equal pitches. Stator winding 212 has as many concentrate-wound coil portions wound around outer slots 213 and inner slots 213' of the same angular position as outer slots 213 (or inner slots 213'). In FIG. 28, only U-phase winding 212 is shown. Therefore, supporting rods 216 are positioned between two concentrate-coil portions to penetrate core back 215.

Figure 29:
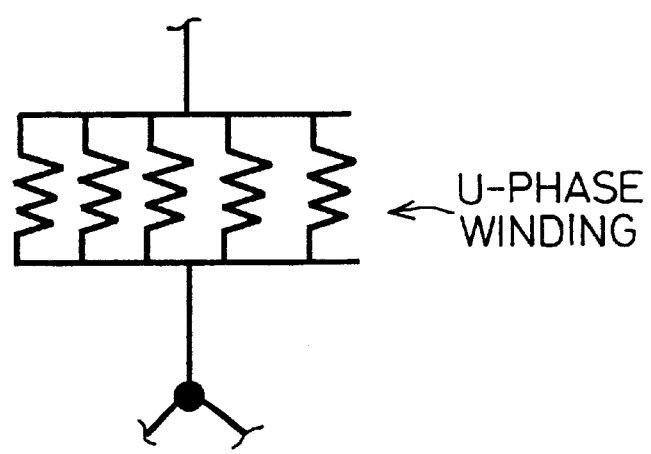
FIG. 29 is a schematic wiring diagram of a U-phase stator winding of the machine shown in FIG. 28.

Winding head 2101 and winding end 2102 of each of concentrate-coil portions projects into the axially front side, and each phase-winding of star-connected stator winding 212 is comprised of all the parallel-connected same-phase concentrate-wound coil portions, as shown in FIG. 29. In the mean while, each U-phase concentrate-wound coil portions are wound every three slots. However, the current supplied to the concentrate-wound coil portion disposed at an odd-numbered slot is opposite in direction to the current supplied to the concentrate-wound coil portion disposed at an even-numbered slot. Therefore, the winding-head 2101 of the odd-numbered concentrate-wound coil portions and the winding-end 2102 of the even-numbered concentrate-wound coil portions are connected to U-phase output terminal 91. In the same manner, the winding-head 2101 of the even-numbered concentrate-wound coil portions and the winding-end 2102 of the odd-numbered concentrate-wound coil portions are connected to neutral-point terminal 94.

Figure 30:
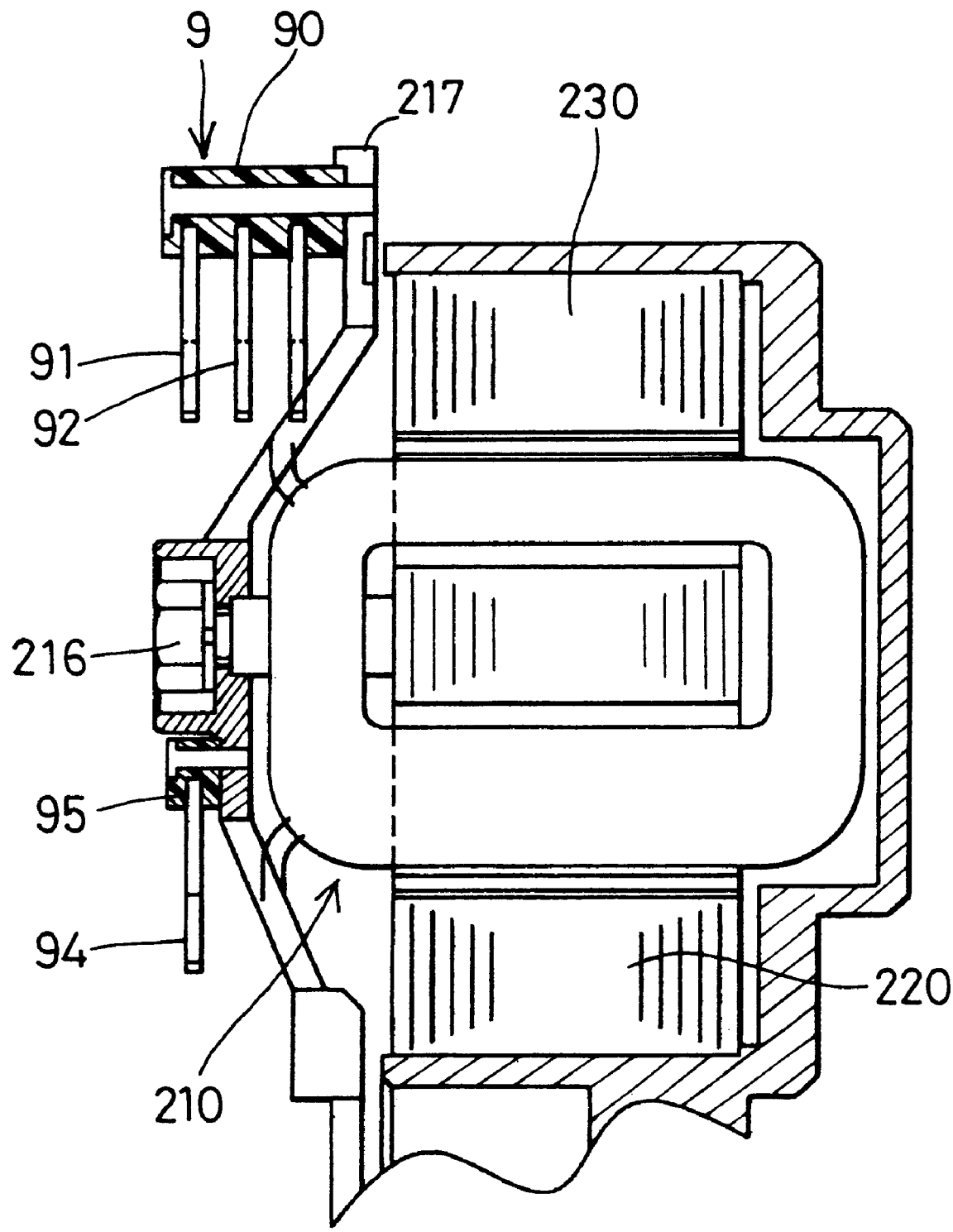
FIG. 30 is a longitudinal cross-sectional view illustrating a portion of the machine shown in FIG. 28.

A stator winding connection structure is described with reference to FIG. 30.

Stator supporting frame 217 (as shown in FIG. 2) has cylindrical three-phase terminal 9 fixed thereto. This three-phase terminal 9 has a plurality of resinous sleeves 90, U-phase output terminal portion 91 supported by resinous sleeves 90 with the outer peripheries fitted into three output-terminal-grooves, V-phase output-terminal portion 92, and W-phase output-terminal portion 93. These output-terminal portions 91–93 are made of copper-ring plates. Resinous sleeves 90 are fastened by bolts (not shown) to stator supporting frame 217 at prescribed circumferential intervals.

Figure 31:
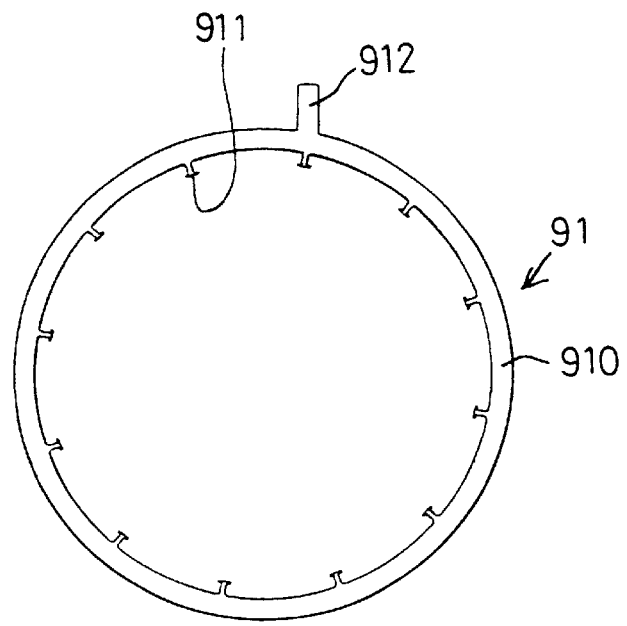
FIG. 31 is a front view of a U-phase output terminal portion shown in FIG. 30.

As shown in FIG. 31, U-phase output-terminal portion 91 has ring portion 910, anchor portions 911 projecting radially inward from the inner periphery of ring portion 910 at the same angular position as U-phase outer slots 213 and inner slots 213', and output terminal 912 projecting radially outward from the outer periphery of ring portion 910. winding ends 2102 or winding heads 2101 are anchored to anchor portions 911. V-phase-output-terminal portion 92 and W-phase output-terminal portion 93 have the same structure as U-phase output-terminal portion 91 and are respectively connected to a V-phase concentrate-wound coil portion and a W-phase concentrate-wound coil portion. Anchor portions 911 of respective output-terminal portions 91–93 are shifted one slot-pitch from one another in the circumferential direction.

Neutral point terminal portion 94 has a plurality of resinous sleeves 95, which is fastened by screws (not shown) at a prescribed circumferential intervals to inner peripheral portions of stator supporting frame 217. Stator supporting frame 217, together with resinous sleeve 90, extends radially inward. Neutral terminal 94 has an outer periphery fitted into a groove formed at resinous sleeve 95.

Figure 32:
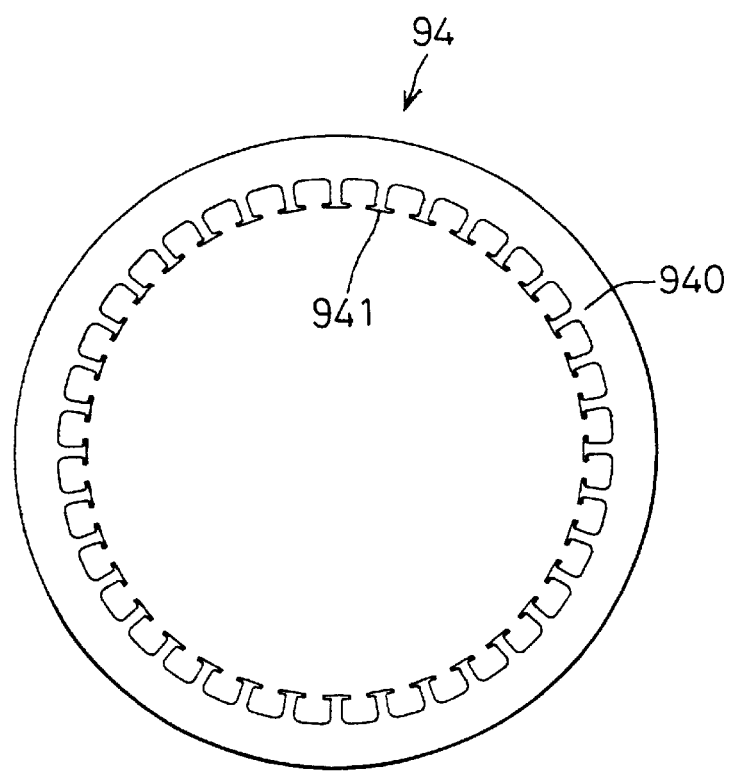
FIG. 32 is a front view of a neutral point terminal shown in FIG. 30.

As shown in FIG. 32, neutral point terminal portion 94 has ring portion 940 and a plurality of anchor portions 941 projecting from the inner periphery of ring portion 940. Anchor portions 941 are formed three times as many as anchor portions 911 of U-phase output terminal portion 91.

Figure 33:
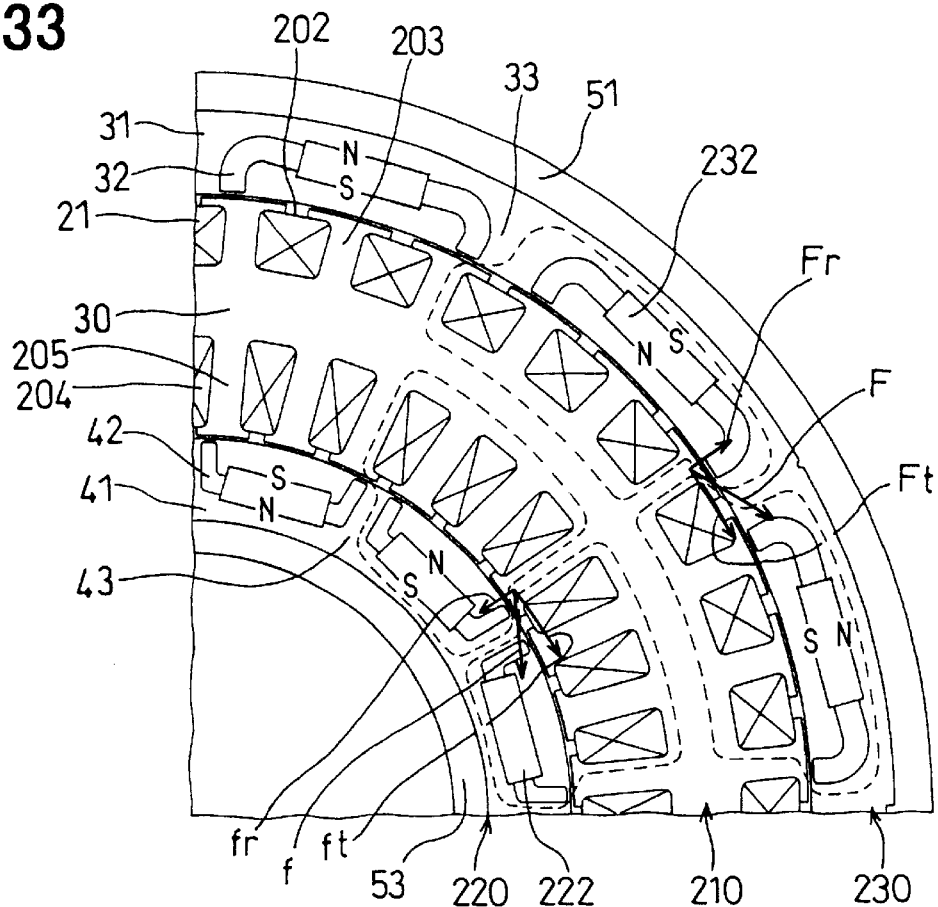
FIG. 33 is a partially radial cross-sectional view of the stator of the machine shown in FIG. 28.

As shown in FIG. 33, outer and inner rotor portions 230 and 220 have permanent magnets 232 and 222, which are buried in the circumferential direction in a well-known IPM (interior permanent magnet) rotor structure and a synchronous motor structure formed of laminated iron sheets.

Each of thin-plate-like permanent magnets 232 is buried in the center of one of a plurality of axially extending curved-grooves formed in the circumferential portions of laminated iron sheets at equal pitches. Each of thin-plate-like permanent magnets 222 is also buried in the center of one of a plurality of axially extending curved-grooves formed in the circumferential portions of laminated iron sheets at equal pitches.

Permanent magnets 232 and 222 are polarized in the thickness direction thereof. Permanent magnets 232 and 222 are respectively disposed at the same angular position so that each pair of permanent magnets 232 and 222 at the same angular position has pole surfaces of the same polarity confronting each other at opposite sides of the stator and so that the polarity of the pole surfaces alternate in the circumferential direction.

The opposite ends of curved grooves and curve toward stator 210 so that salient magnetic poles 33 and 43 can be formed between neighboring two curved grooves 32 and between neighboring two curved grooves 42, 42. Magnetic fluxes generated by a portion of stator winding 212 disposed at neighboring three slots flows easily, as indicated by broken lines in FIG. 33. The opposite ends of curved grooves 32 and opposite ends of curved grooves 42 are respectively disposed at the same angular positions. Accordingly, salient magnetic poles 33 and 43 are formed at the same angular positions. If three-phase voltage is applied to stator winding 212 corresponding to the position of outer rotor portion 230 and inner rotor portion 220, outer rotor portion 230 and inner rotor portion 220 respectively operate as a permanent-magnet-reluctance-type synchronous machine.

The magnetic flux generated by the portion of the winding disposed in neighboring three slots generates electromagnetic forces F and f between salient magnetic poles 33, 43 and the teeth opposite thereto. Circumferential components Ft and ft of the above electro-magnetic forces are reluctance torque. Circumferential components Fr and fr pull outer teeth 214 radially outward and inner teeth 214' radially inward.

Inner slots 213' and inner slots 214' are disposed at the same angular position so that the radial components Fr and fr act on the same angular positions of outer teeth 214 and inner teeth 214'.

The reluctance of the magnetic path encircling the neighboring three slots cyclically changes according to relative location of the openings (slot openings) and salient magnetic poles 33, 34. Therefore, radial components Fr and fr of the electro-magnetic forces F and f cyclically change at a cycle time during which salient magnetic poles 33 and 43 rotate one slot-pitch along the circumference of stator 210.

Figure 34:
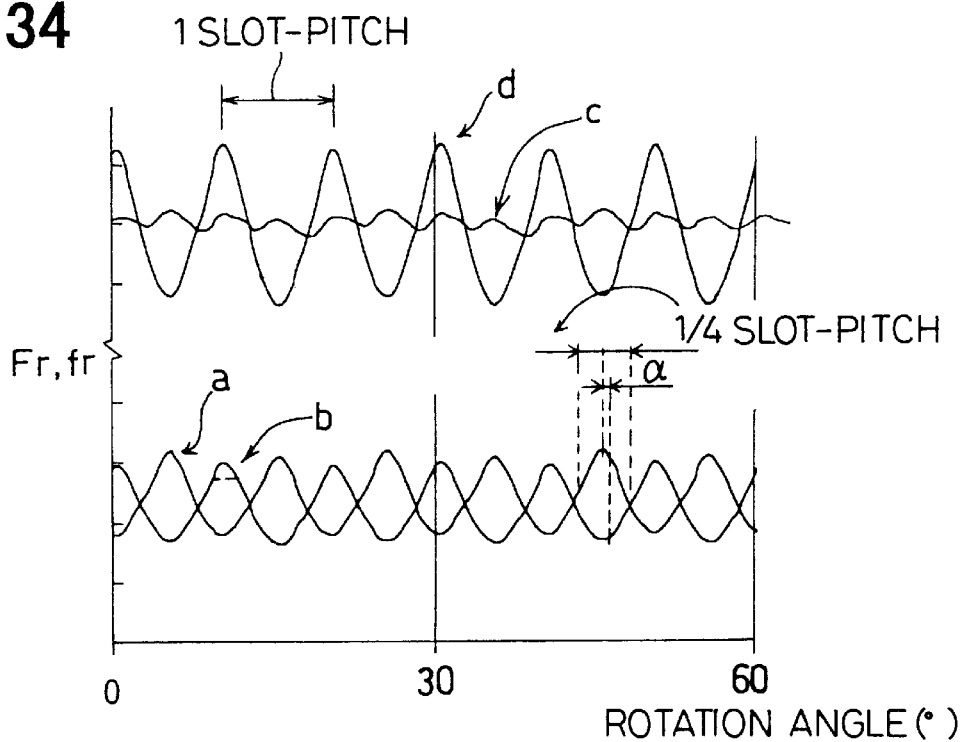
FIG. 34 is a graph showing wave shapes of radial components of the electro-magnetic forces acting on the stator.

In FIG. 34, curve a represents a radial component Fr of the electromagnetic force acting on the outer teeth, curve b represents a radial component fr of the electromagnetic force acting on the inner teeth. The cyclic changes of both forces are opposite to each other. Therefore, the composite force acting on each one of teeth of stator core 211 represented by curve c becomes very small. Curve d represents a radial change of the electro-magnetic force generated in case of a synchronous machine having only inner rotor portion 220 (twice as large in amplitude as a or b).

This rotary electric machine is a three-phase synchronous machine. The rotor position is detected by a rotation sensor. When a three-phase ac voltage is applied to star-connected stator winding 212, outer rotor portion 230 and inner rotor portion 220 generates torque under rotating magnetic fields generated by stator winding 212. Consequently, the machine starts an internal combustion engine via a crankshaft. Thereafter, the machine assists torque of the engine, operates as a regeneration brake or generates an electric power as a well-known vehicle rotary electric machine.

Since the coil ends of stator winding 212 can be made drastically small without dividing stator core 211 into pieces, stator 210 can be supported by one end thereof.

Figure 35:
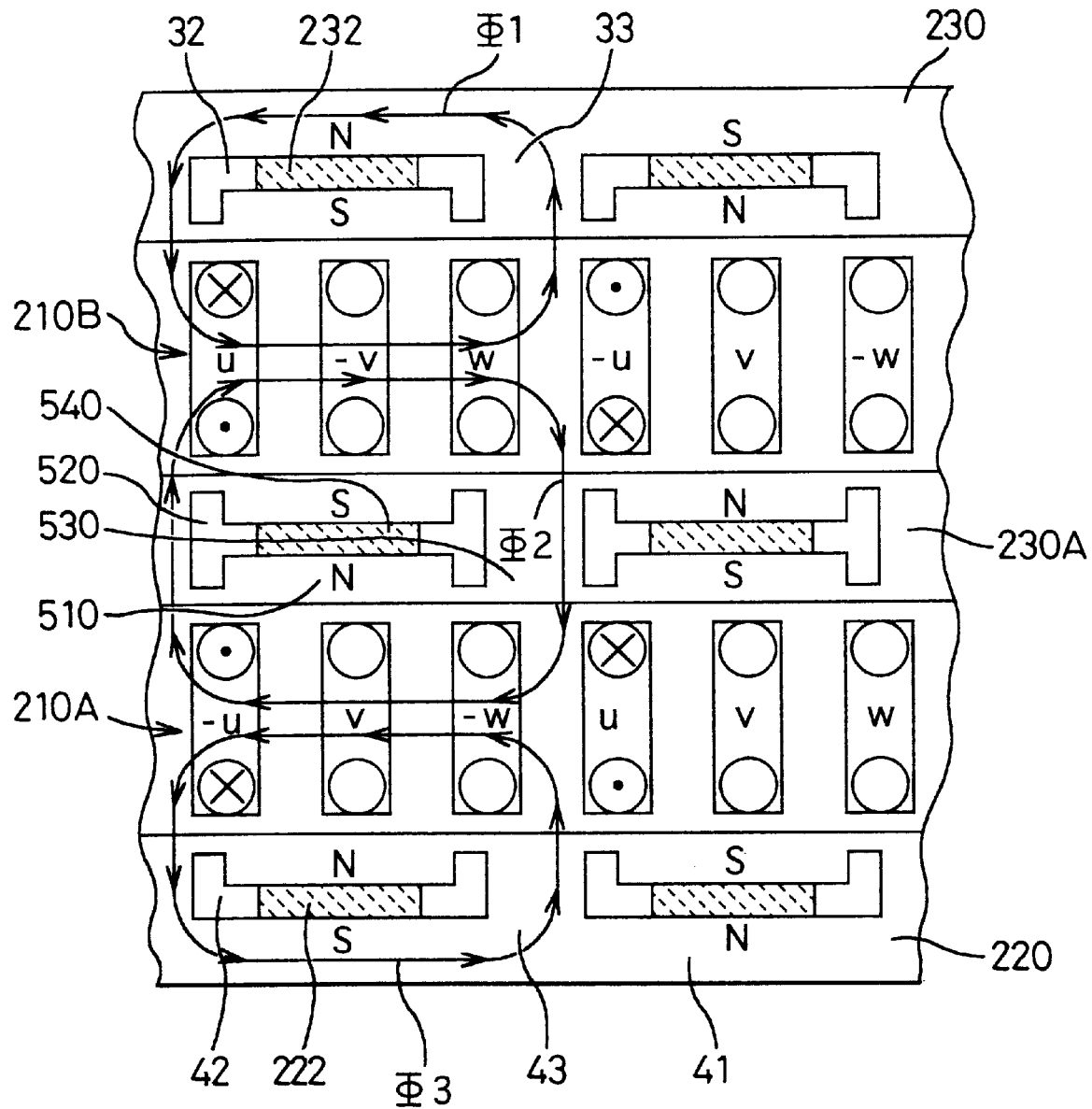
FIG. 35 is a partially exploded view of a vehicle rotary electric machine according to a ninth embodiment of the invention.

A vehicle rotary electric machine according to a ninth embodiment of the invention is described with reference to FIG. 35.

This machine has two stators 210A and 210B piled in the radial direction and three rotor portions 220, 230 and 230A. Each stator is the same in structure as the stator of the machine according to the eighth embodiment.

Each stator is substantially, the same as the first embodiment. However, middle rotor portion 230A is disposed between two stators 210A and 210B.

Middle rotor portion 230A is comprised of laminated iron sheets 510 having curved grooves 520, into which permanent magnets 540 are inserted. Thus, each of salient magnetic poles 530 of middle rotor portion 230A is formed between two permanent magnets 540. These salient magnetic poles 530 generate electro-magnetic force between stators 210A and 210B so that the circumferential components thereof provide the reluctance torque.

However, the magnet gap of the permanent magnets 530 of middle rotor portion 230A is twice as long as the other magnet gaps. Therefore, they have twice as many ampere turns (or thickness) as other permanent magnets. This machine has four electro-magnetic connection surfaces in total so as to generate twice as much torque as the machine according to the eighth embodiment. In addition, radial components of electro-magnetic forces respectively acting on teeth of two stator cores (not shown) balance each other, so that vibration and noises are reduced drastically.

Figure 36:
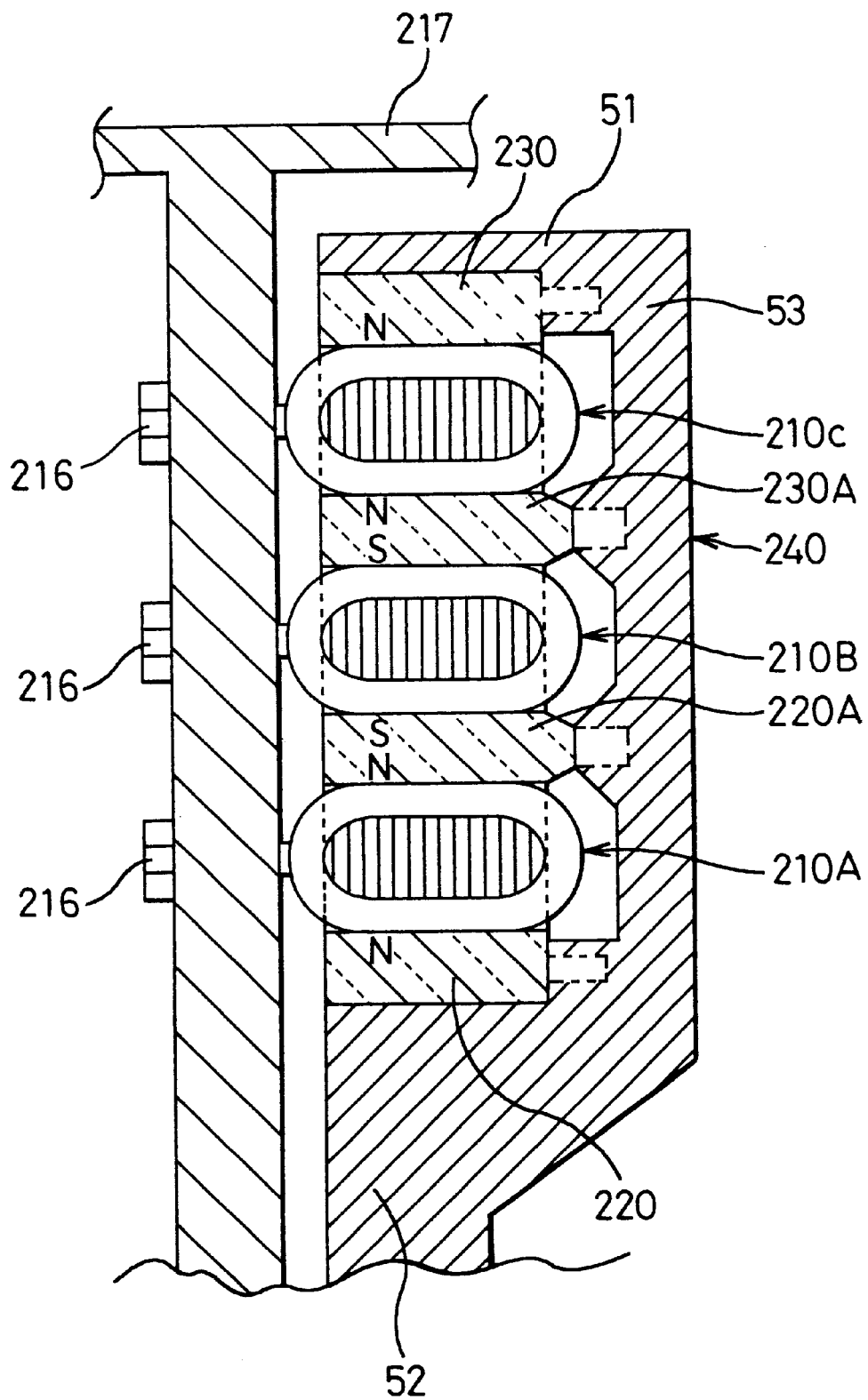
FIG. 36 is a longitudinal cross-sectional fragmentary view of a vehicle rotary electric machine according to a tenth embodiment of the invention.
Figure 37:
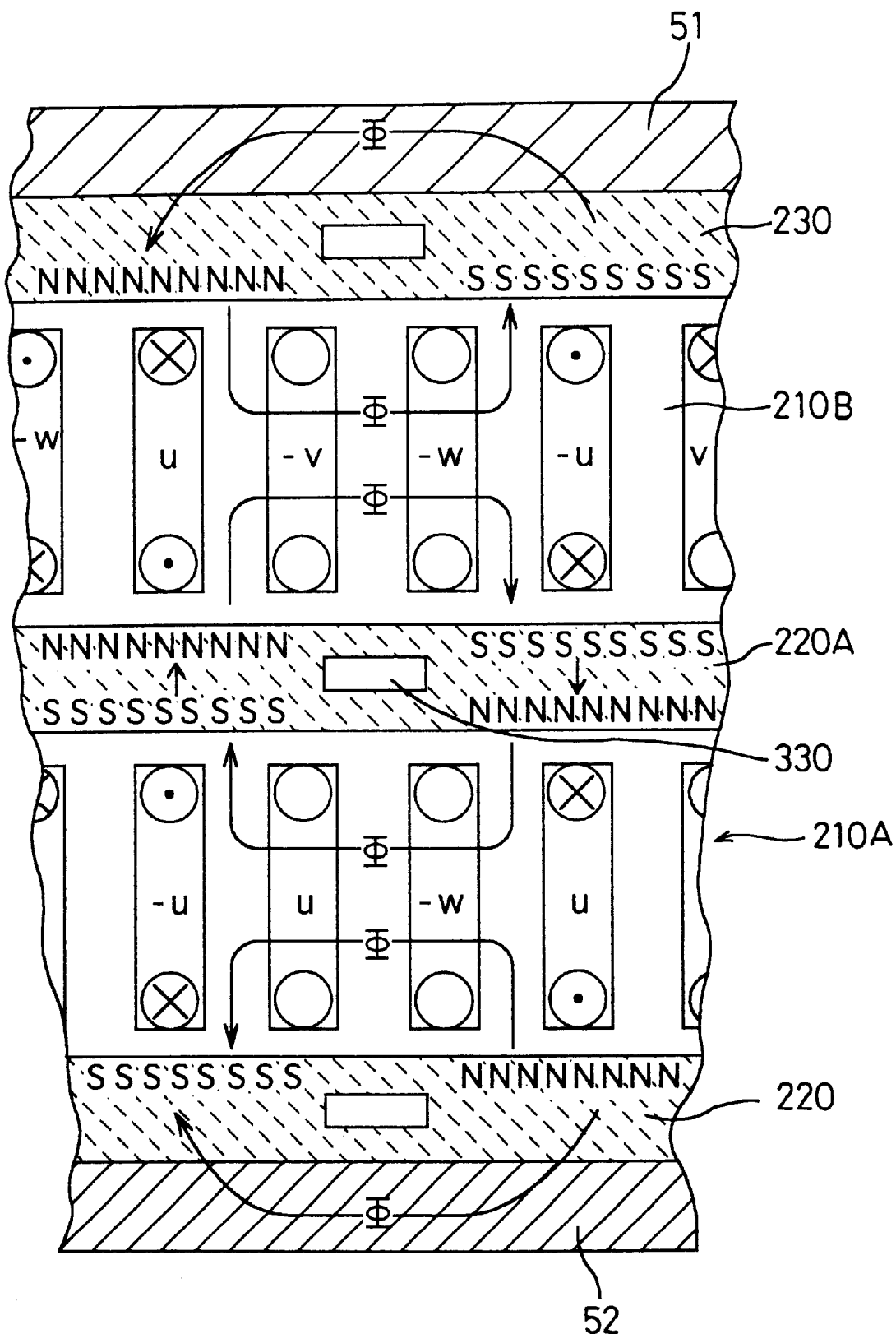
FIG. 37 is a fragmentary exploded view of the rotary electric machine shown in FIG. 36.

A vehicle rotary electric machine according to a tenth embodiment of the invention is described with reference to FIGS. 36 and 37.

The vehicle rotary electric machine, triple stator portions 210A, 210B and 210C and quadruple rotor portions 220, 220A, 230A, and 230 are disposed. In FIG. 37, rotor portion 230 and stator 210C are omitted for simpler illustration, and stator winding 212 is schematically illustrated for better understanding. Each of stator portions is substantially the same as that of the ninth embodiment except for outer slots and inner slots, which are formed deeper at portions nearer the axial ends thereof. Therefore, the axial projecting width of the coil ends of stator winding 212 can be reduced so that the axial length of the vehicle rotary electric machine can be reduced. In addition, the total length of the winding at the coil ends can be reduced.

Quadruple rotor portions 220, 220A, 230A, and 230 are permanent-magnet-type rotors, as in the first embodiment. Quadruple rotor portions 220, 220A, 230A, and 230 have cylindrical ceramic permanent magnets, which are magnetized in the pattern shown in FIG. 37 while or after they are molded. It is also possible to provide buried permanent magnets or exposed permanent magnets.

Two rotor portions (e.g. 220, 220A) on opposite sides of stator (e.g. 210A) have pole surfaces of the same polarity at the same angular positions. That is, pole surfaces of N-pole and pole surfaces of S pole. Two middle rotor portions 220A and 230A have pole surfaces of different pole at the same angular positions.

Because middle rotor portions 220A and 230A are polarized in the radial direction, rotor portions 220A and 230A do not require yokes. Because middle rotor portions 220A and 230A have electro-magnetically connecting surfaces, it is preferable that each of them provides twice as large AT (ampere-turns) as the innermost and outermost rotor portions 220 and 230. Because there are six electro-magnetically connecting surfaces in the radial direction, tree times as large torque as the first embodiment can be provided.

Middle rotor portions 220A and 230A, which are formed of a cylindrical ceramic permanent magnet, do not require a large cross-section of the magnetic path at the middle portion between the N-pole surface and the S-pole surface. This embodiment provides axial air vents 330 at the middle portions. The middle portion can be formed of non-magnetic material. It is possible to insert into some of air vents 330 a supporting rod for fixing the cylindrical ceramic permanent magnet to disk portion 243 of bowl member or rotor-supporting frame 240. An end at the rotor-supporting frame side of each of rotor portions 220, 220A, 230A and 230 is made thin to be fitted into a groove formed at rotor supporting frame 240.

In this embodiment, the smallest diameter side and the largest diameter side of the rotor portions 220 and 230 respectively have cylindrical yokes 51 and 52 for magnetic paths. However, if rotor portions 220 and 230 have their own magnetic paths, rotor-supporting frame 240 can be made of light-weight material such as aluminum die-casting.

It is possible to omit middle portions between circumferentially adjacent pole surfaces from rotor portions 220 and 230. Rotor portions 220, 220A, 230A, and 230 can be substituted by a buried permanent-magnet-type or an exposed permanent-magnet-type. In case of the latter, the rotor portions can have permanent magnets at the radially inner surface and the radially outer side. This multi-layered structure usually has a problem of increasing the ratio of the coil-end portion of stator winding 212 to the in-slot conductor portion thereof. The structure having concentrate-coils can drastically reduce the total length of the coil-end portion, so that the axial length of the rotary electric machine can be reduced.

A vehicle rotary machine according to an eleventh embodiment of the invention is described with reference to FIGS. 38–41.

Outer rotor portion 230 and inner rotor portion 220 form a rotor, which is substantially the same in structure as the rotor of the machine according to the first embodiment.

Figure 38:
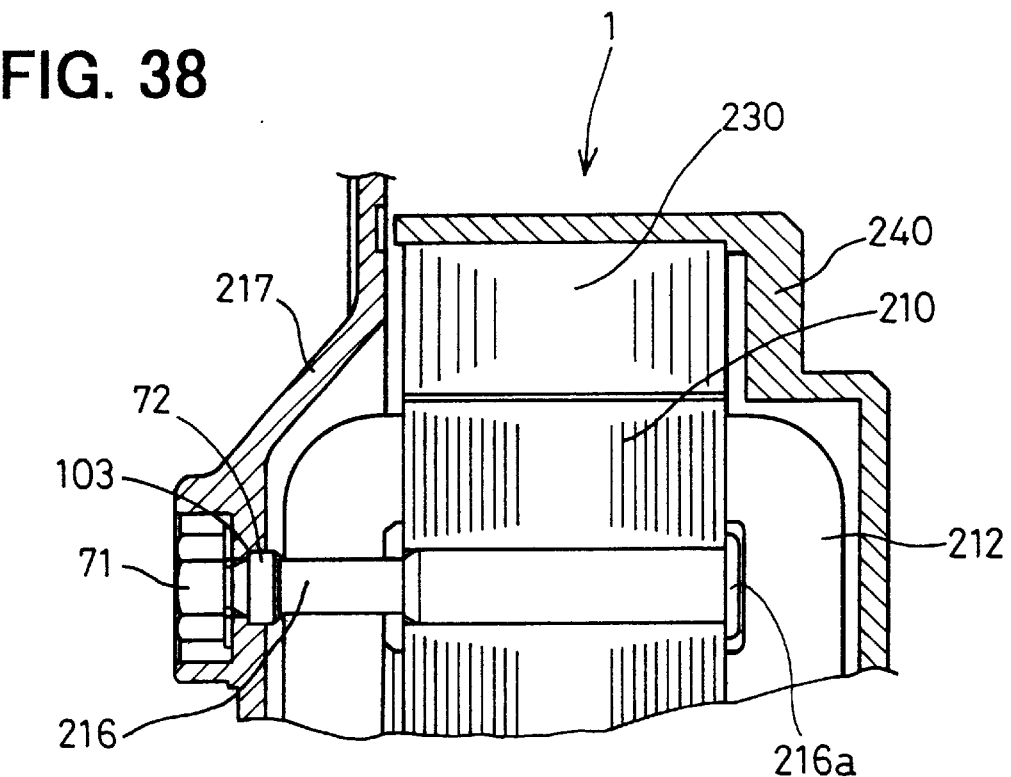
FIG. 38 is a fragmentary enlarged cross-sectional view in the axial direction around a stator of the vehicle rotary electric machine according to an eleventh embodiment of the invention.

As shown in FIG. 38, stator 210 is comprised of stator core 211 disposed in the radial gap between outer rotor portion 230 and inner rotor portion 220 and stator winding (armature coil) 212.

Figure 39:
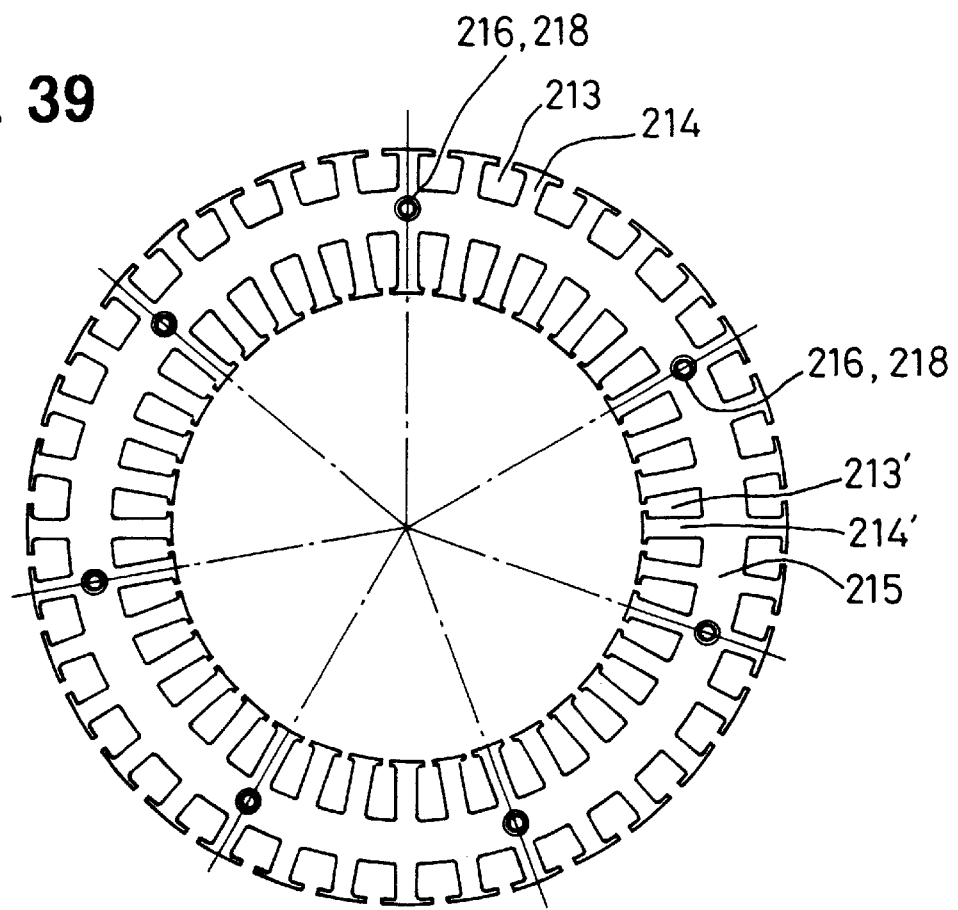
FIG. 39 is an enlarged cross-sectional view of the stator core shown in FIG. 38.

As shown in FIG. 39, a plurality of outer slots 213 and teeth 214, and a plurality of inner slots 213' and teeth 214' are respectively formed at the outer and inner peripheral portions at equal pitches. Stator core 211 has axially extending seven holes 218 in a circumference of the teeth. One of seven through holes 218 is shifted counterclockwise one-slot pitch from the rotation symmetric position of any of the others. As shown in FIG. 38, bolt like supporting rod 216 is force-fitted to each through hole 218.

The edge of supporting rods 216 penetrate axial through holes formed in a radial wall of stator supporting frame 217. A female screw is formed at the edge of each supporting rod 216 and nut 71 is fastened thereto.

Each supporting rod 216 has large-diameter portion 72, which abuts step portion 103 formed in the through hole of supporting frame 217. In other words, the front edge of large-diameter portion 72 abuts a surface (positioning surface) formed in the radial direction of step portion 103. Thus, radial wall of stator supporting frame 217 is axially sandwiched between nut 71 and large-diameter portion 72 to fix stator core 20.

The outer periphery of large-diameter portion 72 abuts the inner periphery (positioning peripheral surface) of step portion 103 to fix the radial position of supporting rod 216. The portion of supporting rod in front of large-diameter portion 72 has a diameter smaller than large-diameter portion 72 so as to be inserted into the through hole. Supporting rod 216 has large-head portion 72a, which abuts the rear surface of stator 210.

Stator winding 212 has as many concentrate-wound coil portions wound around outer slots 213 and inner slots 214 of the same angular position in the same manner shown in FIG. 28. Therefore, supporting rods 216 are positioned between two concentrate-coil portions to penetrate core back 215.

The operation of this vehicle rotary electric machine is substantially the same as the machine according to the eighth embodiment except the cooling structure thereof.

Figure 40:
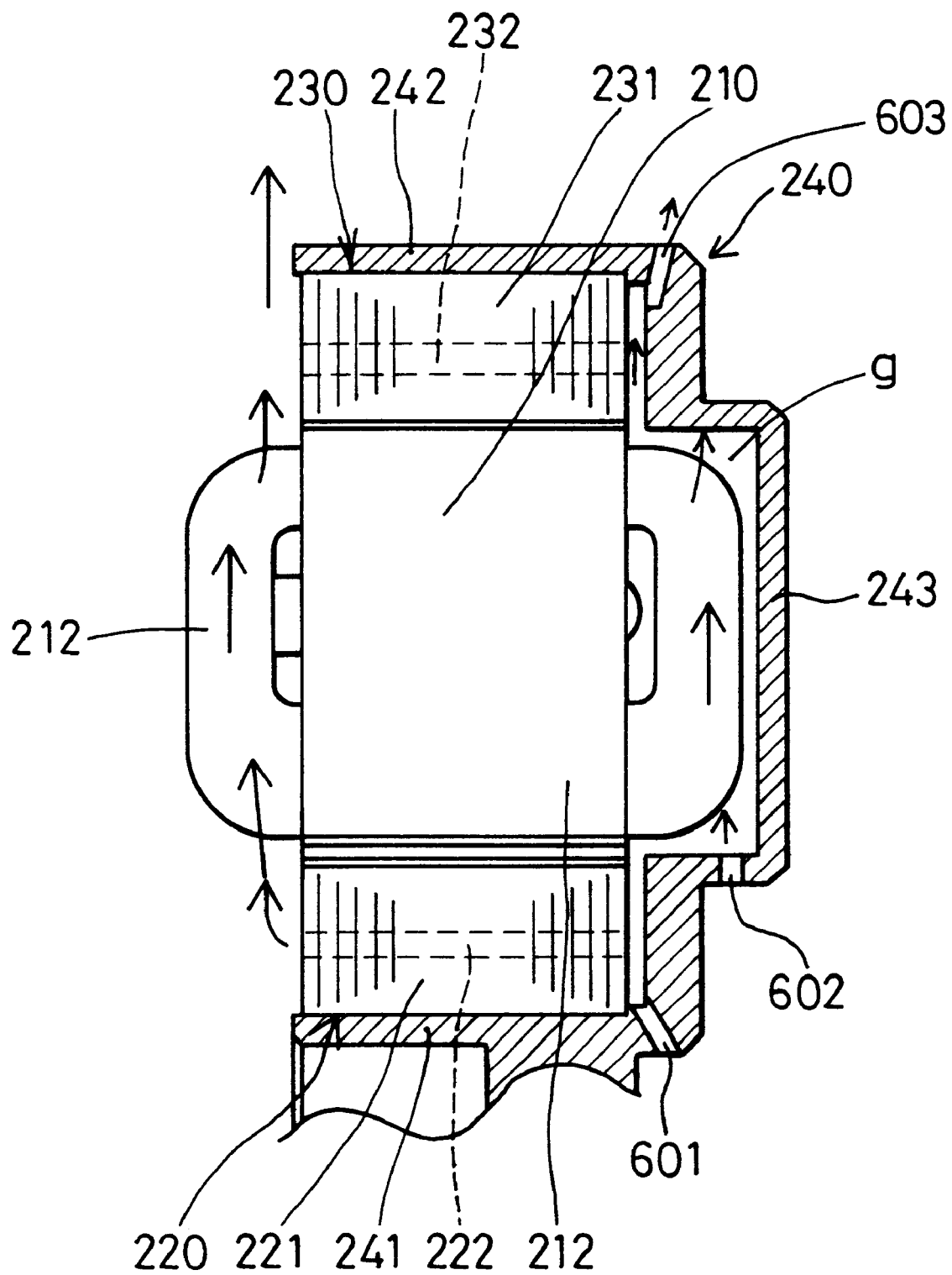
FIG. 40 is a fragmentary enlarged cross-sectional view around the rotor frame of the vehicle rotary electric machine according to the eleventh embodiment.

The cooling structure of the vehicle rotary electric machine is described with reference to FIG. 40 hereafter.

Rotor supporting frame 240 has air inlets 601, 602 at an inner peripheral portion of disk portion 243, air outlet 603 at an outer peripheral portion of disk portion 243. Each of inlets 601, 602 and outlet 603 is connected to axially extending gap (the gap of the invention) g formed between outer and inner rotor portions 240, 230 and rotor supporting frame 240 and between stator 2 and rotor supporting frame 240.

When rotor supporting frame 240 rotates, inlets 601, 602 and outlet 603 takes air from outside into gap g as a centrifugal fan. The radially outer end of each of inlets 601, 602 and outlet 603 is shifted a prescribed angle from the radially inner end thereof in the direction opposite the rotation direction. This provides smooth air flows. Cooling air flows along gap g and forms a spiral locus as long as it contacts to cool the surfaces of rotor portions 220 and 230 and stator 210 until it is discharged from air outlet 603.

Inner rotor magnetic core 221 has a plurality of axially extending permanent magnet holes 222, and outer rotor magnetic core 231 has a plurality of axially extending permanent magnet holes (through holes) 232. Each magnet hole (through hole) 222, 232 is formed in the circumferential direction at equal intervals to let air in gap g flow in the axial direction so that rotor core can effectively cooled. Magnet holes 222 and 232 are formed at circumferentially opposite sides of permanent magnets (not shown). If the opposite ends thereof are bent toward stator core 211, rotor magnetic core 221, 231 will have magnetic salient poles, which generate reluctance torque.

Supporting rod 216 is formed of a cylindrical iron member, which has a center through hole. A copper member is inserted into the center through hole to effectively transfer heat.

A long hermetic space can be formed around the center axis of supporting rod 216 to accommodate an amount of liquid that boils at a temperature of ranging between 10 and 100 degrees in Centigrade so that supporting rod 216 can function as a heat pipe Supporting rod 216 may provide a longitudinally extending parallel grooves as air passages at the surface thereof. It is also possible to have copper wires inserted in the grooves to improve the heat conductivity thereof.

Stator core 211 may have a plurality of axially extending through holes at portions of the teeth where supporting rod 216 is not disposed or concentrated coils 210 are not disposed. The through holes may be used as cooling air passages. It is also possible that heat conductive members are inserted into the through holes.

Figure 41:
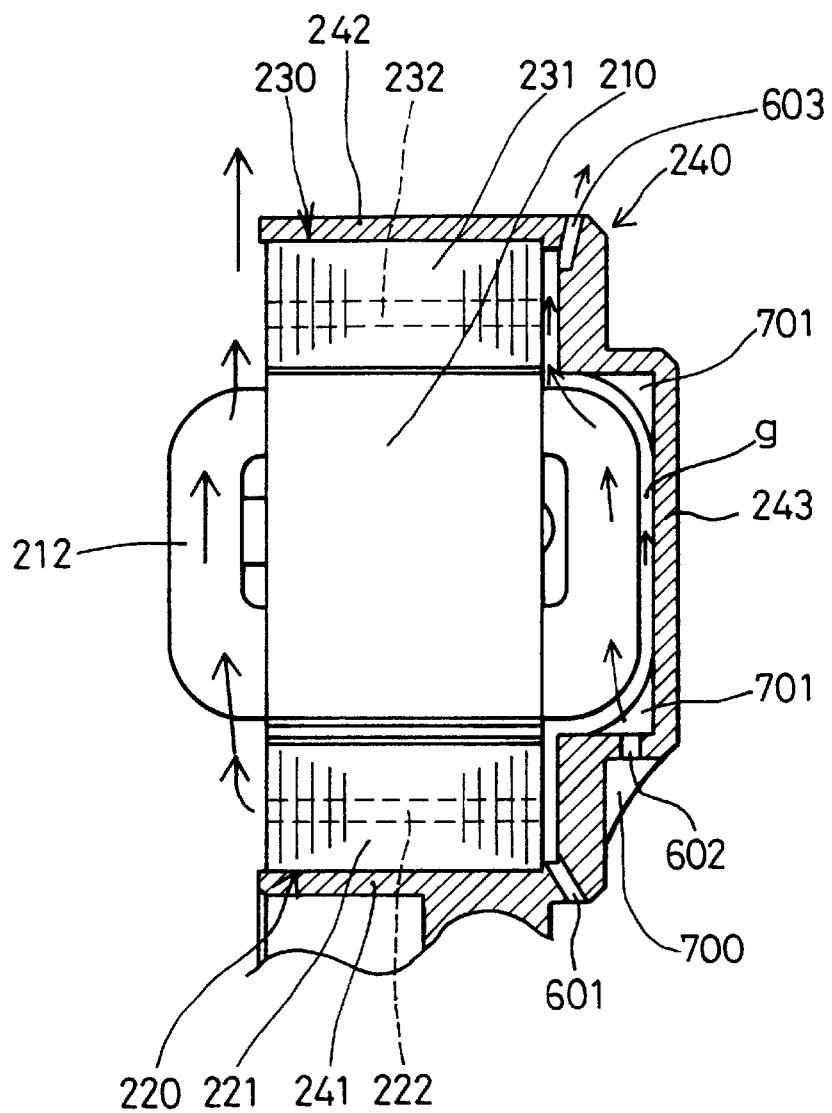
FIG. 41 is a fragmentary enlarged cross-sectional view in the axial direction of the vehicle rotary electric machine according to a twelfth embodiment of the invention.

A vehicle rotary electric machine according to twelfth embodiment is described with reference to FIG. 41 hereafter.

A plurality of equally spaced centrifugal fan-blades 700, 701 are formed in the circumferential direction at opposite surfaces of disk portion 243 of rotor frame 240. Centrifugal fan-blades 700 take air into air inlet 602, and centrifugal fan-blades 701 increase the radial component of the air-flow speed in gap g. Therefore, rotor 3 and stator 2 are effectively cooled by air in gap g.

Figure 42:
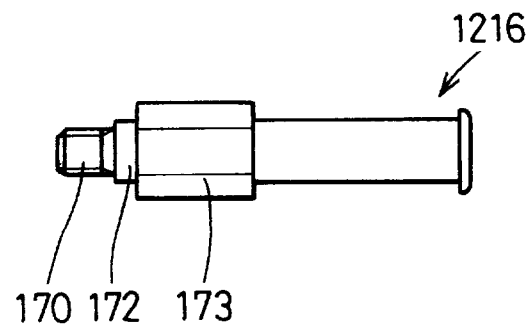
FIG. 42 is a plan view illustrating a variation of a supporting member of the vehicle rotary electric machine.

A variation of the tenth embodiment is described with reference to FIG. 42.

Each supporting rod 1216 has large-diameter-spacer 173 adjacent large diameter portion 172. An end of spacer portion 173 abuts the radial wall of supporting frame 217 and the other end thereof abuts an end of stator 210. Therefore, spacer portion 173 fixes stator 210 in the axial direction, and stator 210 reduces the radial shift due to radial elastic deformation of supporting rods 1216. Therefore, radial vibration of stator core 211 can be reduced, and heat of stator 210 is transferred to supporting frame 217 effectively via spacer 173.

Figure 43:
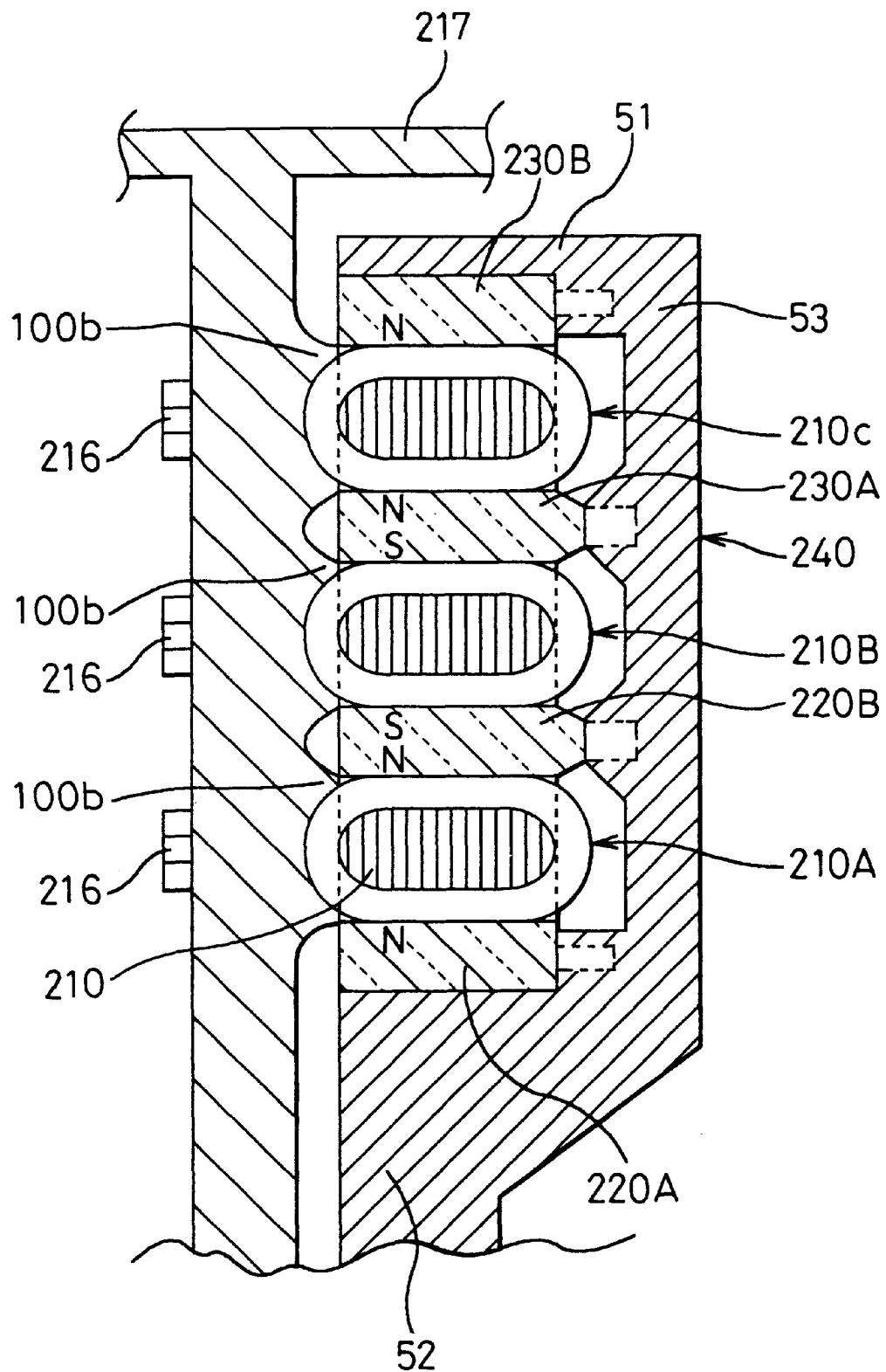
FIG. 43 is a longitudinal cross-sectional fragmentary view of the vehicle rotary electric machine according to a thirteenth embodiment of the invention.

FIG. 43 shows a vehicle rotary electric machine according to a thirteenth embodiment of the invention that is applied to an engine-driven vehicle. For better understanding, the same reference numeral in the drawings represents the component that has the same function. Stator 210 is formed into triple rings as in the tenth embodiment.

Radially middle rotor portions 230A and 220B can have a structure mainly having axial magnetic paths. Stator 210 may have a plurality of axially extending through holes 218, as shown in FIG. 39, at portions of the teeth where supporting rod 216 is not disposed or the concentrated coils are not disposed. Such through holes 218 may be used as cooling air passages. It is also possible that heat conductive members are inserted into the through holes.

As shown in FIG. 43, stator supporting frame 217 has a plurality of projections 100b abutting the front end of stator 210. These projections 100b are respectively disposed between adjacent concentrate-wound coils. Through hole 218 penetrates projection 100b and force fitted to a hole (which is not shown) formed in stator core 211.

The radial wall of stator supporting frame 217 and projection 100b are joined by casting or die-casting. The abutting end of projection 100b on the stator core may be machined.

Thus, the resiliency of each stator core 211 can be increased, and heat of stator 210 can be transferred to the housing via projections 100b.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than restrictive, sense.

What is claimed is:

1. A power assisting and regenerating rotary electric machine disposed between a vehicle engine and a torque transmission mechanism connected coaxially with a crankshaft at a back of said vehicle engine, said rotary electric machine comprising:

a housing;

a stator fixed to said housing, said stator including a stator core having a radially outer surface and a radially inner surface and a stator winding having a set of multi-phase windings wound on said stator;

a controller for controlling current supplied to said stator winding according to vehicle conditions thereby operating the rotary electric machine under a prescribed condition;

a rotor including an outer rotor portion having an inner surface electro-magnetically connected to said radially outer surface of said stator and an inner rotor portion having an outer surface electro-magnetically connected to said radially inner surface of said stator;

a bowl member disposed between the crank shaft and the torque transmission mechanism, said bowl member including an inner cylinder portion supporting a radially inner side of said inner rotor portion and connected to the crank shaft, an outer cylinder portion supporting a radially outer side of said outer rotor portion and an annular portion connecting said inner cylinder portion and outer cylinder portion, said annular portion being connected to the torque transmission mechanism.

2. The power assisting and regenerating rotary electric machine as claimed in claim 1, wherein said stator core comprises slots and teeth circumferentially formed at prescribed intervals at the inner surface opposite said inner rotor portion and at the outer surface opposite said outer rotor portion and a core back disposed between separate said slots formed at said outer surface and said slots formed at said inner surface, and said stator winding is wound serially in said slots formed at said inner surface and said slots formed at said outer surface.

3. The power assisting and regenerating rotary electric machine as claimed in claim 2, wherein said slots formed at said inner surface and said slots formed at said outer surface are disposed opposite sides of said core back at the same circumferential electromagnetic positions, and each of said phase windings of said stator winding is wound to form a U-shaped cross-section in the circumferential direction on said slot formed at said inner surface and said slots formed at said outer surface at the same electric angular pitches.

4. The power assisting and regenerating rotary electric machine as claimed in claim 2, wherein said slots formed at said inner surface and said slots formed at said outer surface are disposed opposite sides of said core back at the same circumferential electromagnetic positions, and each of said phase windings of said stator winding is wound to form a square cross-section in said slot formed at said inner surface and said slots formed at said outer surface at the same slot pitches that correspond to the magnetic pole pitches.

5. The power assisting and regenerating rotary electric machine as claimed in claim 2, wherein said slots formed at said inner surface and said slots formed at said outer surface are disposed opposite sides of said core back at the same circumferential electromagnetic positions, and each of said phase windings of said stator winding is wave-wound at approximately the same slot pitches that correspond to the magnetic pole pitches so that current flowing at said slots formed at said inner surface and current flowing said slots formed at said outer surface are opposite to each other.

6. The power assisting and regenerating rotary electric machine as claimed in claim 1, wherein said inner rotor portion has an interior permanent-magnet rotor-structure that includes a magnetic core having a plurality of magnetic holes in the circumferential direction and a plurality of permanent magnets respectively disposed in said magnet holes, and said outer rotor portion has a reluctance-type-rotor-structure that includes a plurality of arc-shaped slits and a plurality of arc-shaped magnetic paths in a coaxial arrangement in the circumferential direction.

7. The power assisting and regenerating rotary electric machine as claimed in claim 6, wherein the circumferentially central portion of a magnetic pole of said reluctance-type-rotor-structure is disposed at a position a defined electric angle in advance of the circumferentially central portion of a magnetic pole of said interior permanent-magnet-type-rotor-structure in the rotation direction.

8. The power assisting and regenerating rotary electric machine as claimed in claim 2, wherein said stator is fixed to said housing by a supporting rod member that is force-fitted to said core back in the axial direction.

9. The power assisting and regenerating rotary electric machine as claimed in claim 1, wherein one of said outer and inner rotor portions has an interior permanent-magnet rotor-structure that includes a magnetic core having a plurality of circumferentially disposed magnetic holes at prescribed intervals and a plurality of permanent magnets respectively disposed in said magnet holes.

10. The power assisting and regenerating rotary electric machine as claimed in claim 2, wherein said slots formed at said outer surface and said slots formed at said inner surface are disposed at the same circumferential positions at opposite sides of said core back, and said magnetic poles of said inner rotor portion and said outer rotor portion disposed at the circumferentially the same position are polarized in the opposite direction.

11. The power assisting and regenerating rotary electric machine as claimed in claim 2, wherein said slots formed at said outer surface and said slots formed at said inner surface are disposed at opposite side of said core back and shifted from each other at half slot pitch in the circumferential direction.

12. The power assisting and regenerating rotary electric machine as claimed in claim 1, wherein said stator core has a plurality of outer slots and teeth formed in the outer peripheral surface thereof at certain pitches and a plurality of inner slots and teeth formed in the inner peripheral surface thereof at certain pitches, each of the inner surface of said outer rotor portion and the outer surface of said inner rotor portion has a salient pole portion having a small magnetic resistance, when the circumferential center of said salient pole portion of said outer rotor portion and the circumferential center of said outer slot opening of said stator core are disposed at the same angular position, the circumferential center of said salient pole portion of said inner rotor portion and the circumferential center of said inner slot opening of said stator core are shifted from each other at an interval that is equal to or less than ¼ of a slot-pitch.

13. The power assisting and regenerating rotary electric machine as claimed in claim 12, wherein when the circumferential center of said magnetic salient pole of said outer rotor portion and the circumferential center of said outer slot opening of said stator core are positioned at the same angular position, the circumferential center of said magnetic salient pole of said inner rotor portion and the circumferential center of said inner slot opening of said stator core are positioned at approximately the same angular position.

14. The power assisting and regenerating rotary electric machine as claimed in claim 13, wherein the circumferential center of said magnetic salient pole of said outer rotor portion and the circumferential center of said magnetic salient pole of said inner rotor portion are positioned at approximately the same angular position, the circumferential center of said outer slot opening of said stator core and the circumferential center of said inner slot opening of said stator core are positioned at approximately the same angular position, and said outer slots and said inner slots that are positioned at the same angular position respectively accommodate conductors of the same phase but of opposite direction.

15. The power assisting and regenerating rotary electric machine as claimed in claim 14, wherein said outer slots and said inner slots that are positioned at the same angular position accommodate a concentration-wound stator winding.

16. The power assisting and regenerating rotary electric machine as claimed in claim 15, wherein said rotor has said outer rotor portion, at least one middle rotor portion and said inner rotor portion, said stator is disposed at a radial space between said outer rotor portion and said middle rotor portion and at a radial space between said middle rotor portion and said inner rotor portion, the inner periphery and outer periphery of said middle rotor portion have low-reluctance salient poles formed at the same angular positions at defined pole pitches, the circumferential centers of said outer rotor portion, said inner rotor portion and said middle rotor portion are positioned at approximately the same angular position, and the center of slot-openings of said stator is positioned at approximately the same angular position.

17. The power assisting and regenerating rotary electric machine as claimed in claim 1, wherein said said inner cylindrical portion has a bottom plate fixed to the crankshaft.

18. The power assisting and regenerating rotary electric machine as claimed in claim 1, wherein each of said inner rotor portion and said outer rotor portion has reluctance-type-rotor-structure that includes a plurality of arc-shaped slits and a plurality of arc-shaped magnetic paths in a coaxial arrangement in the circumferential direction.

19. The power assisting and regenerating rotary electric machine as claimed in claim 1, wherein each of said inner rotor portion and said outer rotor portion has an interior permanent-magnet rotor-structure that includes a magnetic core having a plurality of magnetic holes in the circumferential direction and a plurality of permanent magnets respectively disposed in said magnet holes.

* * * * *